United States Patent
Halbraich et al.

(10) Patent No.: US 9,276,903 B2
(45) Date of Patent: Mar. 1, 2016

(54) BRANCH IP RECORDING

(75) Inventors: Eran Halbraich, Bet Zayit (IL); Ilan Yosef, Pardessiya (IL); Yariv Lenchner, Petach Tikva (IL); Stas Margolis, Alfei Menashe (IL); Leonid Portman, Rishon Lezion (IL); Dan Hadari, Hod Hasharon (IL)

(73) Assignee: NICE-SYSTEMS LTD., Ra'anana (IL)

( * ) Notice: Subject to any disclaimer, the term of this patent is extended or adjusted under 35 U.S.C. 154(b) by 2891 days.

(21) Appl. No.: 11/652,143

(22) Filed: Jan. 11, 2007

(65) Prior Publication Data
US 2008/0170561 A1 Jul. 17, 2008

(51) Int. Cl.
*H04L 29/06* (2006.01)
*H04M 3/42* (2006.01)
*H04M 7/00* (2006.01)

(52) U.S. Cl.
CPC .............. *H04L 63/00* (2013.01); *H04L 63/30* (2013.01); *H04M 3/42221* (2013.01); *H04M 7/006* (2013.01)

(58) Field of Classification Search
CPC ... H04L 63/00; H04L 63/30; H04M 3/42221; H04M 7/006
USPC ....................... 370/352–356; 379/67.1, 88.17
See application file for complete search history.

(56) References Cited

U.S. PATENT DOCUMENTS

| | | | |
|---|---|---|---|
| 5,923,744 A | 7/1999 | Cheng | |
| 6,473,375 B1* | 10/2002 | Aramaki | 369/47.13 |
| 6,570,976 B2 | 5/2003 | Asada et al. | |
| 6,751,297 B2 | 6/2004 | Nelkenbaum | |
| 7,656,796 B1* | 2/2010 | Ciavattone | 370/230 |
| 2005/0055399 A1 | 3/2005 | Savchuk et al. | |
| 2005/0141678 A1 | 6/2005 | Anders | |
| 2006/0233321 A1* | 10/2006 | Barker et al. | 379/67.1 |
| 2006/0268847 A1* | 11/2006 | Halbraich et al. | 370/352 |
| 2007/0263785 A1* | 11/2007 | Williams et al. | 379/67.1 |

OTHER PUBLICATIONS

International Search Report for International Application No. PCT/IL07/00045. Date of mailing Oct. 27, 2008.

* cited by examiner

*Primary Examiner* — Khaled Kassim
(74) *Attorney, Agent, or Firm* — Pearl Cohen Zedek Latzer Baratz LLP

(57) ABSTRACT

Apparatus for recording multi-party Internet Protocol (IP) sessions at a branch, the apparatus comprising: a data capturer, deployed on a device in a local network of the branch, configured to capture at least one data packet of a multi-party IP session involving the branch; and a recorder, deployed on the device, associated with the data capturer, and configured to receive at least one of the captured data packets from the data capturer and to record the received data packets.

38 Claims, 16 Drawing Sheets

BRANCH IP RECORDING

FIELD AND BACKGROUND OF THE INVENTION

The present invention relates to recording and more particularly, but not exclusively, to a method and apparatus for branch IP recording.

Capturing and recording media data is a frequent and well known practice within commercial environments, as well as among private individuals.

For instance, many industries rely on call centers for the collection and dissemination of critical customer information. As call volumes grow, and customer data collection and customer inquiries become more complex, businesses increasingly look for additional functionality, efficiency and flexibility in their communication systems.

There are many systems developed for recording and archiving telecommunication transactions in commercial environments, where the recording is carried out centrally.

For example, in U.S. Pat. No. 5,923,744, to Cheng, entitled "Intercepting call communications within an intelligent network", filed on Apr. 24, 1997, the inventor describes a method of intercepting call communications within an intelligent network (IN) for law enforcement purposes under the Communications Assistance for Law Enforcement Act (CALEA) at a dedicated service control point (SCP) and routing calls and calling information from a public telephone network to selected subscribers for special centralized services.

U.S. Pat. No. 6,751,297, to Nelkenbaum, entitled "Method and system for multimedia network based data acquisition, recording and distribution", filed on Dec. 11, 2000, introduces an intelligent digital recording system, in conjunction with public centralized network resources.

Nelkenbaum provides wide area multimedia (Fax, Internet, Screens, Video, Voice, etc.) recording services.

The architecture taught by Nelkenbaum allows parallel recording from a variety of communication sources, i.e., wired and wireless networks etc. The stored data can be accessed by the end users via a variety of multimedia formats, or can be distributed to the users on a predetermined schedule using several different storage and/or transmission mediums.

U.S. patent application Ser. No. 11/005,816, to Anders, entitled "Centralized voice over IP recording and retrieval method and apparatus", field on Dec. 7, 2004, teaches an apparatus and methodology for recording, at a central data center, telephone conversations originating from remote locations.

Anders discloses a methodology for recording and storing voice and related data at a central data center remote from either the origin or destination locations of a telephone call placed by an inmate in a prison or other facility.

The technology disclosed by Anders permits storage of both voice and call related data at a remote facility in such a manner that the data is searchably accessible by authorized personnel at other remote locations by way of network or Internet connection to the central data center.

U.S. patent application Ser. No. 11/442,876, to Barker, entitled "Voice over IP telephone recording architecture", filed on May 30, 2006, describes a method and system for on-demand recording of a voice session by a telephone recording device in a telecommunication network.

With Barker, after establishing a voice session between the telephone recording device and a communication device, a user of the telephone recording device may instruct the recording device to store voice data during the voice session so long as the voice session has not been terminated.

U.S. patent application Ser. No. 11/452,917 entitled "Voice over IP Capturing" assigned to Nice Systems Ltd. discloses a network device which is configured to capture communication (voice, video, text, etc) carried over voice over internet protocol (VoIP) data traffic in an internet protocol (IP) network. The captured data may then be forwarded to a remote server.

The systems described hereinabove are dependent on the smooth and continuous operation of the network connecting a remote branch and a center where the actual recording of calls (or other media) captured at the branch is carried out.

Though there are current solutions to branch recording that are independent of the central server. The current solutions have the disadvantages of needing dedicated equipment in the branch, expensive, a maintenance burden and cost, a large footprint, and lack support for new multimedia types.

Simple recording solutions such as tapes, several known propriety solutions, and the like are also unsatisfactory, because it is not feasible to retrieve relevant information or interaction as rapidly and completely as is usually required.

There is thus a widely recognized need for, and it would be highly advantageous to have, a system devoid of the above limitations.

SUMMARY OF THE INVENTION

According to one aspect of the present invention, there is provided an apparatus for recording multi-party Internet Protocol (IP) sessions at a telecommunications branch having an existing branch device associated therewith, the apparatus comprising: a) a data capturer, configured to capture at least one data packet of a multi-party IP session involving the branch, and a recorder, associated with the data capturer, and configured to receive at least one of the captured data packets from the data capturer and to carry out local branch recording of the received data packets, the apparatus being deployed on the existing branch device.

According to a second aspect of the present invention, there is provided an apparatus for recording metadata of multi-party Internet Protocol (IP) sessions at a telecommunications branch having an existing branch device associated therewith, the apparatus comprising: a) a metadata capturer, configured to capture metadata relating to a multi-party IP session involving the branch, the apparatus being deployed on the existing branch device.

According to a third aspect of the present invention, there is provided a method for recording multi-party Internet Protocol (IP) sessions at a branch, the method comprising: a) on an existing branch device, capturing at least one data packet of a multi-patty IP session involving the branch, and b) recording at least one of the captured data packets at the branch.

According to a fourth aspect of the present invention, there is provided a system for recording multi-party Internet Protocol (IP) sessions at a plurality of branches, each of the branches having a respective existing branch device, the system comprising: a) at least one data capturer, deployed on a respective one of the existing branch devices, and configured to capture at least one data packet of a multi-party IP session involving the branch, b) at least one branch recorder, deployed on the branch device, associated with the data capturer, and configured to receive at least one of the captured data packets from the data capturer and to record the received data packet, and c) at least one remote recorder, remotely communicating with the branch recorder, configured to receive the captured data packets from the branch recorder.

According to a fifth aspect of the present invention, there is provided a client embodied on a computer readable device, for recording multi-party Internet Protocol (IP) sessions at a branch having an existing branch device, the client comprising: a data capturer, embeddable in chassis of the exiting branch device, and configured to capture at least one data packet of a multi-party IP session involving the branch.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit.

As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1A:
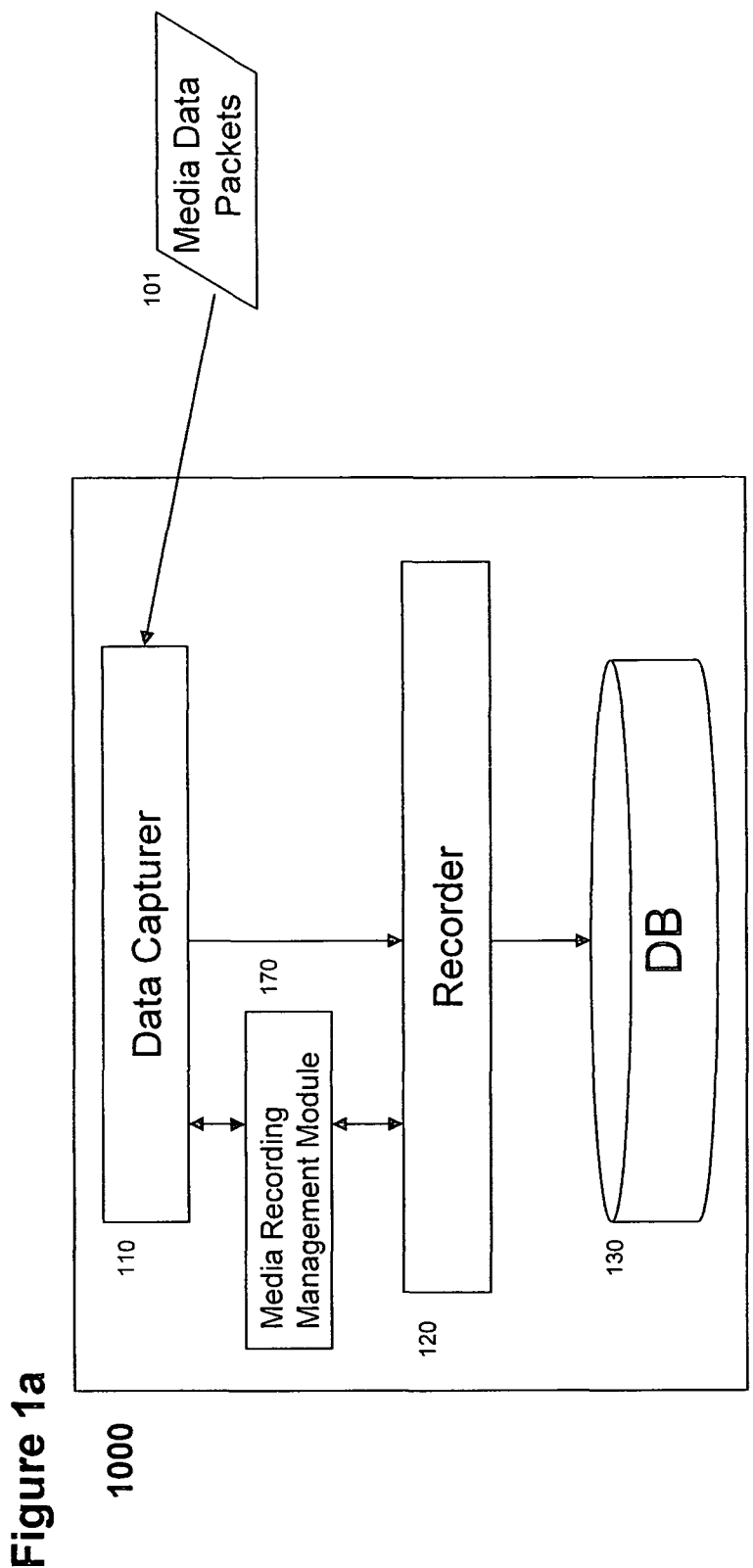
FIG. 1a is a block diagram illustrating a first apparatus for recording multi-party Internet Protocol (IP) sessions at a branch, according to a preferred embodiment of the present invention.

The present embodiments comprise an apparatus and method for recording a multi-party Internet Protocol (IP) telecommunications session at a branch involved in the session.

With a method according to a preferred embodiment of the present invention, data packets (say media data packets such as voice data, video data, etc.) of a multi-party Internet Protocol (IP) session involving a branch are recorded on a branch device at the branch.

The branch device is a network device which is exposed to all data packets transmitted in a local network, say in an Ethernet local network, as known in the art.

Preferably, the recording is carried out using an apparatus which co-resides on the branch device, at the branch. For example, the apparatus may be deployed on a router or a media gateway, and implemented as a server blade, as a flash module, etc., as known in the art.

The co-residency of the apparatus on the branch device allows the recording apparatus to use the chassis and power supply of the branch device, and share common user interfaces with the branch device.

The co-residency of the apparatus on the device, at the branch, may allow a small footprint due to the simplicity and lightness of the apparatus. That is to say it does not need its own power supply or independent connections.

Other advantages are low bandwidth consumption, ease of development, simplified connectivity requirement, and improved data security, as will be explained below.

Preferably, the apparatus further provides for unified recording platforms for a range of multimedia data types, including voice, screen capture, instant messaging, and video.

Preferably, by co-residing on the device in a local network of the branch, the apparatus allows the IP session data to be recorded locally, without consuming additional resources, thereby providing a uniform local backup. The IP session data may be forwarded to the remote party, say a central recording system, as described in further detail hereinbelow.

Preferably, the local recording of data allows the branch to easily survive unintentional disconnection from the remote party (say the central recording system), as the recording of the IP session data continues even during the unintentional disconnection from the remote party. Once the local network of the branch recovers from the unintentional disconnection, data may be sent to the remote party.

The principles and operation of an apparatus and method according to preferred embodiments of the present invention may be better understood with reference to the drawings and accompanying description.

Thus within the context of the present invention, a branch device is a network device or appliance that is a part of the network or telephony infrastructure and may be deployed at the branch or a remote site. The device can also be placed and used in any other network location.

The benefits of using an embedded recording concept, where a recording apparatus co-resides as a part of a network device (at the branch or any other location) may vary according to location of the branch device.

At a remote branch location, an embedded recording apparatus installed on the branch device may be used for recording, thus adding to the tasks which the branch device is used for (Routing, switching etc.).

At a centralized location, the recording apparatus uses the benefits of easy access to the network traffic which passes through the branch device, which is used as a router or a switch, so the recording may be carried out easily by achieving easy access to the traffic to be recorded.

Other benefits of using the branch device is the minimization of the use of dedicated servers for recording, etc, as described in further detail hereinabove.

Examples of branch devices include, but are not limited to: a router, a gateway, a network switch, a hub, an Internet Protocol (IP) Private Branch Exchange (PBX), or any network appliance or server which performs communication based or computational based tasks, as known in the art.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1a, which is a block diagram illustrating a first apparatus for recording multi-party Internet Protocol (IP) sessions at a branch, according to a preferred embodiment of the present invention.

Apparatus 1000 is deployed on a branch device at a local communication branch.

References herein to a branch device refer in fact to any network device, which is exposed to relevant data packets transmitted to and from a local network, say an Ethernet local network, as known in the art.

For example, the apparatus 1000 may be deployed on a branch device such as a router or a gateway, and implemented as a server blade, flash modules, etc., as described in further detail hereinabove.

Preferably, the apparatus 1000 shares the same chassis and power supply with the device. Preferably, apparatus 1000 and the branch device also share a common user interface for maintaining, monitoring, and alerting, thus lowering the footprint of the apparatus 1000.

By sharing with the device the chassis, user interface, etc, the apparatus 1000, co-resides with the device, as described in further detail hereinbelow.

By co-residing with the device, the apparatus 1000 provides small footprint resultant on the simplicity and lightness of the apparatus 1000. The apparatus 1000 further provides low bandwidth—as the data is recorded locally, simplified connectivity requirements—as the apparatus 1000 uses the communication connectors of existing branch device, enhanced security—utilizing security mechanisms the branch device is already installed with, ease of development, improved data security—as the data is automatically backed-up, etc.

Preferably, the apparatus 1000 further provides with a unified recording service for a range of multimedia types including, but not limited to: voice, screen capture, keyboard capturing (say for software development QA recording tools), instant messaging, video, or any combination thereof.

Apparatus 1000 includes a data capturer 110.

The data capturer 110 captures one or more data packets 101 of a multi-party Internet Protocol (IP) session involving the branch, such as Real-time transport protocol (RTP) data packets.

Real-time transport protocol (RTP) is the Internet-standard protocol for the transport of real-time data, including audio and video. RTP is used in most voice-over-IP architectures, for videoconferencing, media-on-demand, and other applications. RTP is a thin protocol, which supports content identification, timing reconstruction, and detection of lost packets.

The data packets 101 may be media data packets, which include, but are not limited to media data packets carrying: voice, screen capture, instant messages, video, other rich media, and a combination thereof. That is to say, the data capturer 110 may provide a unified universal capacity for capturing data of a variety of media types.

Optionally, the data capturer 110 is instructed to start or end the capturing of the media data packets, according to metadata such as Computer Telephony Integration (CTI) data, say by the interaction controller(s) 250 described hereinbelow Apparatus 1000 may also include a recorder 120, connected to the data capturer 110.

The recorder 120 receives one or more of the captured data packets from the data capturer 110 and records the received data packets, say in a database 130, as described in further detail hereinbelow.

Preferably, the recorder 120 is instructed to start or end the recording of the media data packets, according to metadata such as Computer Telephony Integration (CTI) data, say by the interaction controller(s) 250 described hereinbelow Preferably, the recorder 120 also interacts with a remote receiver, such as a central recording device deployed at a central location, and forwards one or more of the recorded data packets to the remote party.

Preferably, the recorder 120 uses a predefined protocol for forwarding the data packets to the remote party. Using the protocol, the recorder 120 data packets are integrated with recorded data received by the remote party in previous interactions.

Optionally, the apparatus 1000 implements an interaction based recording mode.

In the interaction based recording mode, the recorder 120 starts recording at a start of an IP session, for example a phone call, and stops when the session ends, say when the phone conversation ends.

Preferably, oily selected data packets are recorded by the recorder 120. For example, the data capturer 110 may select the data packets for recording by the recorder 120, say according to IP address of the data packets, as described in further detail hereinbelow, for exemplary data capturers 7000 and 8000.

Optionally, the apparatus 1000 implements a total recording mode. In the total recording mode, the recorder 120 continuously records the data packets captured by the data capturer 110.

Preferably, the recorder 120 detects silence or noise at a channel where the session takes place, and avoids recording silent data packets, as described in further detail hereinbelow, for data capturers 7000 and 8000.

Optionally, the apparatus 1000 may be implemented as a part of a central recording system, which uses a remotely situated central recorder for all branches.

Preferably, the recorder 120 forwards the captured packets to the remotely located central recorder immediately after the IP session's recording ends.

The recorder 120 may also have lightweight configuration. For example, the recorder 120 may have a relatively short term storage capacity, as known in the art, which is used as a buffer. The buffer temporarily stores the data, and the recorder 120 forwards the data to the remote central recorder, say upon the buffer being filled with data, etc, as known in the art.

The apparatus 1000 may also be implemented as a multi site recording system with several remote recorders (where each remote recorder receives data from one or more of the branch recorders 120 preassigned to the remote recorder by an operator or administrator of the apparatus 1000), as described in further detail hereinbelow.

Optionally, the apparatus 1000 also includes a media recording management module 170, connected to the data capturer 110 and the recorder 120.

The media recording management module 170 may be used by an operator or administrator of the apparatus 1000, for customizing the data capturer 110 and the recorder 120, say for defining IP addresses to capture media data packets such as video data packet, audio data packets there from.

Preferably, apparatus 1000 is implemented as a Video Management System. In the Video Management System, the data capturer 110 is used for capturing video data, and the recorder 120 is used for recording the captured video data and forwarding the video data to remote parties, say a remote operator of a the Video Management System.

The video management module system may also include tools provided to the user (or administrator), for integrating video data in the data packets, editing the video data, archiving the video data, analyzing the video data, etc, as known in the art.

Figure 1B:
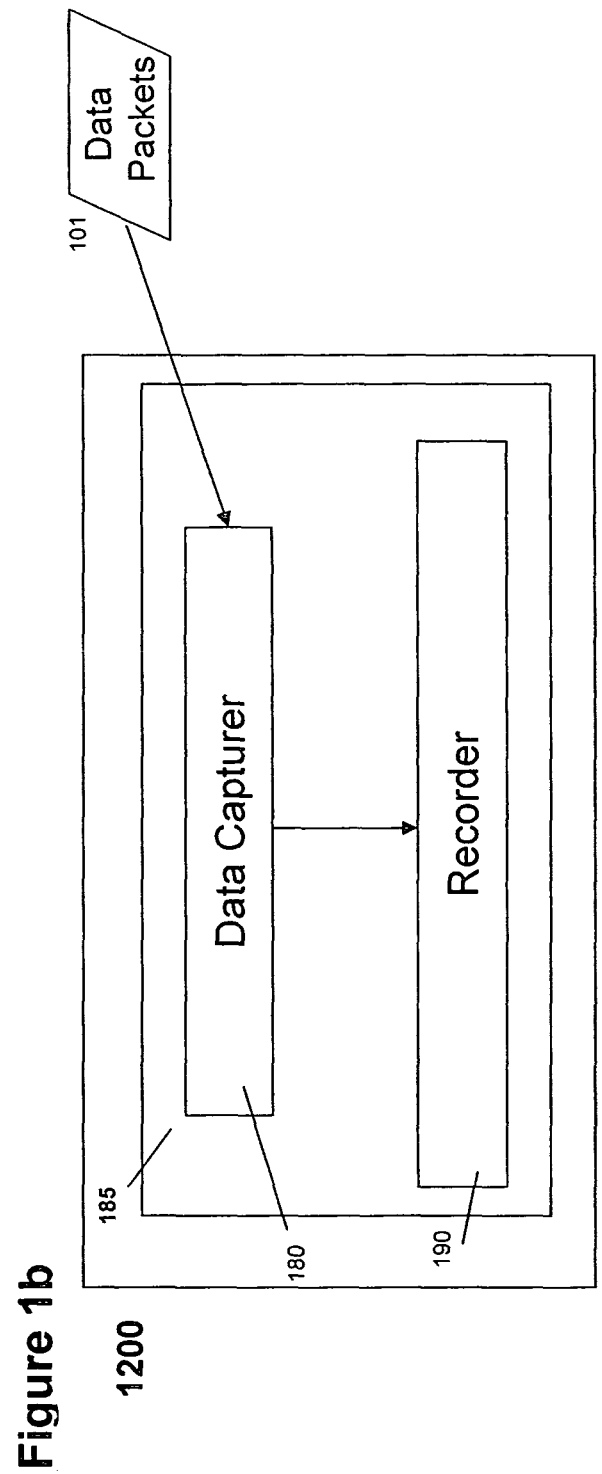
FIG. 1b is a block diagram illustrating a client for recording multi-party Internet Protocol (IP) sessions at a branch, according to a preferred embodiment of the present invention.

Reference is now made to FIG. 1*b*, which is a block diagram illustrating a client for recording multi-party Internet Protocol (IP) sessions at a branch, according to a preferred embodiment of the present invention.

Client 1200 includes a data capturer 180.

The data capturer 180 is embeddable in a branch device at the branch. For example, the data capturer 180 may be deployed on a router 185 or a media gateway, and be implemented as a server blade, flash modules, etc., as described in further detail hereinabove.

The deployed client 1200 co-resides on the branch device, at the branch. For example, the apparatus may be deployed on a router or a media gateway, and implemented as a server blade, as a flash module, etc., as known in the art.

The co-residency of the client 1200 deployed on the branch device allows the client 1200 to use the chassis and power supply of the branch device, and share common user interfaces with the branch device, as described in further detail hereinbelow.

The data capturer 180 captures one or more data packets 101 of a multi-party Internet Protocol (IP) session involving the branch.

The data packets may include, but are mot limited to media data packets, such as Real-time transport protocol (RTP) data packets, as described in further detail hereinabove.

Optionally, the client 1200 also includes a recorder 190, which is embeddable in the branch device, connected to the data capturer 180.

The recorder 190 receives one or more of the captured data packets from the data capturer 180 and records the received data packets at the branch, say in a database, as described in further detail hereinbelow.

Figure 2:
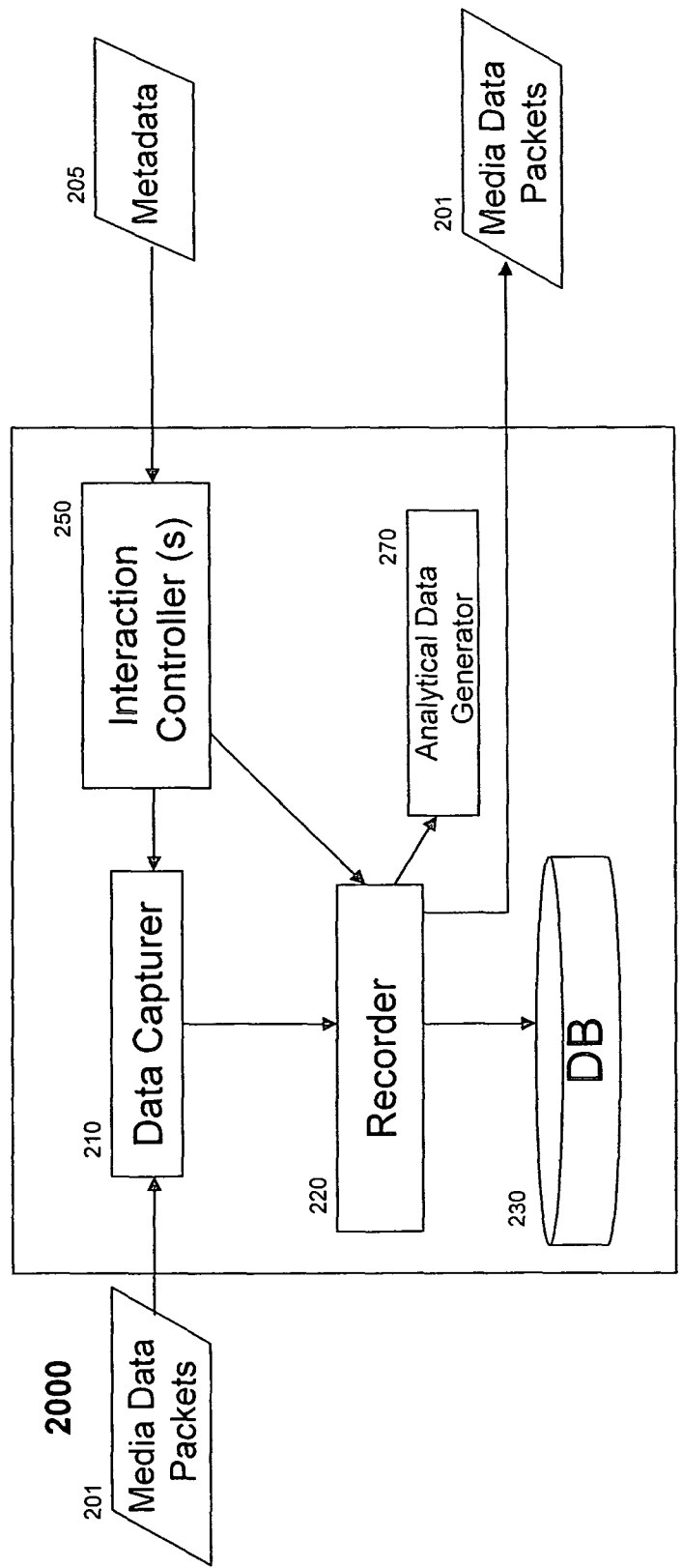
FIG. 2 is a block diagram illustrating a second apparatus for recording multi-party Internet Protocol (IP) sessions at a branch, according to a preferred embodiment of the present invention.

Reference is now made to FIG. 2, which is a block diagram illustrating a second apparatus for recording multi-party Internet Protocol (IP) sessions at a branch, according to a preferred embodiment of the present invention.

Apparatus 2000 includes a data capturer 210, deployed on a branch device, as described in further detail hereinabove.

The data capturer 210 captures one or more media data packets 201 of a multi-party Internet Protocol (IP) session involving the branch, such as Real-time transport protocol (RTP) data packets, as described in further detail hereinabove.

Preferably, the data capturer 210 further captures media data file(s), recorded and stored on predefined device(s), or files injected from external resources, as described in further detail hereinbelow.

The media data files may include files which hold data streams of multi-party Internet Protocol (IP) sessions, recorded and stored in advance of the capturing by the data capturer 210. For example, the media files may be recorded and stored by local devices such as a phone, a voice mail server, a gateway, etc.

Apparatus 2000 also includes a recorder 220, deployed on the network device, and connected to the data capturer 210.

The apparatus 2000 co-resides on the branch device, as described in further detail hereinabove. The recorder 220 receives one of more of the captured media data packets 201 from the data capturer 210 and records the received media data packets 201, say in a database 230, as described in further detail hereinbelow.

Preferably, the recorder 220 reassembles the IP session's data stream, by ordering the media data packets 201 according to their original IP session order, and stores each reassembled IP session data stream in a data file, as described in further detail hereinbelow.

Preferably, the recorder 220 may also carry out additional processing of the media data.

The additional processing may include, but is not limited to: encryption, decryption, trans coding—compression of media data, summation—a voice compression method where voice streams of all participators of a session are summed together, for producing a single output stream, word spotting—for spotting predefined words in voice, emotion detection for detecting a speaker's emotion based on an analysis of his voice stream, translation of speech to text, talk over detection—to detect when two or more participants of a session talk simultaneously, repacketization—repackaging media data, so as to allow more efficient network utilization, and speaker identification—automatic identification of a person whose voice is captured in the media data packets.

The additional processes are based on known in the art methods.

Optionally, the recorder 220 uses dedicated database(s) and utility modules, for carrying out the additional processes.

Apparatus 2000 also includes an interaction controller 250, connected to the data capturer 210 and the recorder 220.

The interaction controller 250 captures metadata 205 pertaining to the IP session.

For example, data packets bearing metadata or Computer Telephony Integration (CTI) data relating to the multi party IP session involving the branch may be sent to the interaction controller 250 from a CTI Server, as described in further detail hereinbelow. A local or remote CTI server may be preconfigured for sending CTI data towards the interaction controller 250, which captured the CTI data and uses the CTI data for controlling the data capturer 210, the recorder 220, etc., as describe in further detail hereinbelow.

Computer Telephone Integration (CTI) systems combine data with voice (or other media) systems in order to enhance telephone services. For example, in a Call Center, CTI systems may use automatic number identification (ANI) to retrieved details of a caller, and route the call to the appropriate party. A CTI System used for automatic telephone dialing from an address list in a database is an outbound example.

Optionally, the interaction controllers 250 interacts with one or more remote CTI server(s), for capturing CTI data from the CTI server(s).

Preferably, upon unintentional disconnection from the remote CTI server, the interaction controller 250 automatically switches to a local CTI server, for capturing the Computer Telephone Integration (CTI) data relating to the multi-party IP session from the local CTI server, until the remote CTI server is reconnected.

When the connection to the remote CTI server is recovered, the interaction controller 250 may reconnect to the remote CTI server.

Preferably, the interaction controller 250 also records the metadata 205 (say, the Computer Telephone Integration data) relating to the multi-party IP session in a database, as described in further detail hereinbelow.

Preferably, the interaction controller 250 may also forward the metadata 205 or a part of the CTI data to the remote party, say on a daily basis, upon a request made by the remote party, etc.

Using the metadata 205, the interaction controller 250 may control interaction between the data capturer 210 and the branch device, for capturing the media data packets 201 which arrive at the branch device, as described in further detail hereinabove.

The interaction controller 250 may also use the metadata 205, to control the recording of the captured data packets 201 by the capturer 220, as described in further detail hereinabove.

Preferably, the interaction controller 250 also controls interaction of the recorder 220 with one or more remote parties, say a central recording device deployed in a remote location. The interaction with the remote party is used by the recorder 220, to forward at least one of the recorded media data packets 201 to the remote party.

In one exemplary embodiment, the apparatus 2000 includes two interaction controllers 250. A first interaction controller 250 captures and uses metadata 205, to control interaction between the recorder 220 and one or more remote parties, while a second interaction controller 250 controls interaction between the data capturer 210 and one or more devices the media data packet 201 originate from, as described in further detail hereinabove.

Optionally, the recorder 220 forwards the recorded media data packets 201 to the remote party in real time, during the Internet Protocol (IP) session.

Optionally, the recorder 220 forwards the recorded media data packets 201 to the remote party according to a policy predefined by a user or administrator of the apparatus 2000.

For example, the recorder 220 may forward the recorded media data packets 201 on an hourly basis. The recorder 220 may forward the media data packets 201 when the network experiences low bandwidth consumption, or upon a request made by the remote party, as described in further detail hereinbelow.

Optionally, the recorder 220 forwards one or more of the recorded media data packets 201 to the remote party, upon detecting a termination of the Multi-party IP session. For example, the interaction controller 250 may receive Computer Telephony Interaction (CTI) data indicating the termination of the IP session from a local or remote CTI server. Based on the CTI data, the interaction controller 250 triggers the forwarding of the recorded media data packets 201 by the recorder 220.

Preferably, when a network disconnection occurs between the recorder 220 and the remote party, the recorder 220 records the media data packets 201 locally, say at the database 230 described hereinabove. Upon recovering from the network disconnection, the interaction controller 250 establishes a connection with the remote party. The recorder 220 may be instructed by the interaction controller 250 to use the interaction to forward the recorded media data packets 201 to the remote party.

Preferably, the recorder 220 uses a predefined protocol for forwarding the media data packets 201 to the remote party. Optionally, using the protocol, the recorded media data packets 201 are integrated with recorded media data received by the remote party in previous interactions.

Preferably, apparatus 2000 also includes an analytical data generator 270, connected to the recorder 220.

The analytical data generator 270 generates analytical data pertaining to the recording of the media data packets 201. Preferably, the analytical data generator 270 generates the analytical data in real time. For example, the analytical data generator 270 may generate data pertaining to all IP telephony calls which exceed a duration limit predefined by an administrator.

Preferably, the analytical data generator 270 may forward the analytical data to a remote party, say using an interaction between the analytical data generator 270 and the remote party. The interaction may be controlled by the interaction controller 250, as described in further detail hereinabove.

Figure 3:
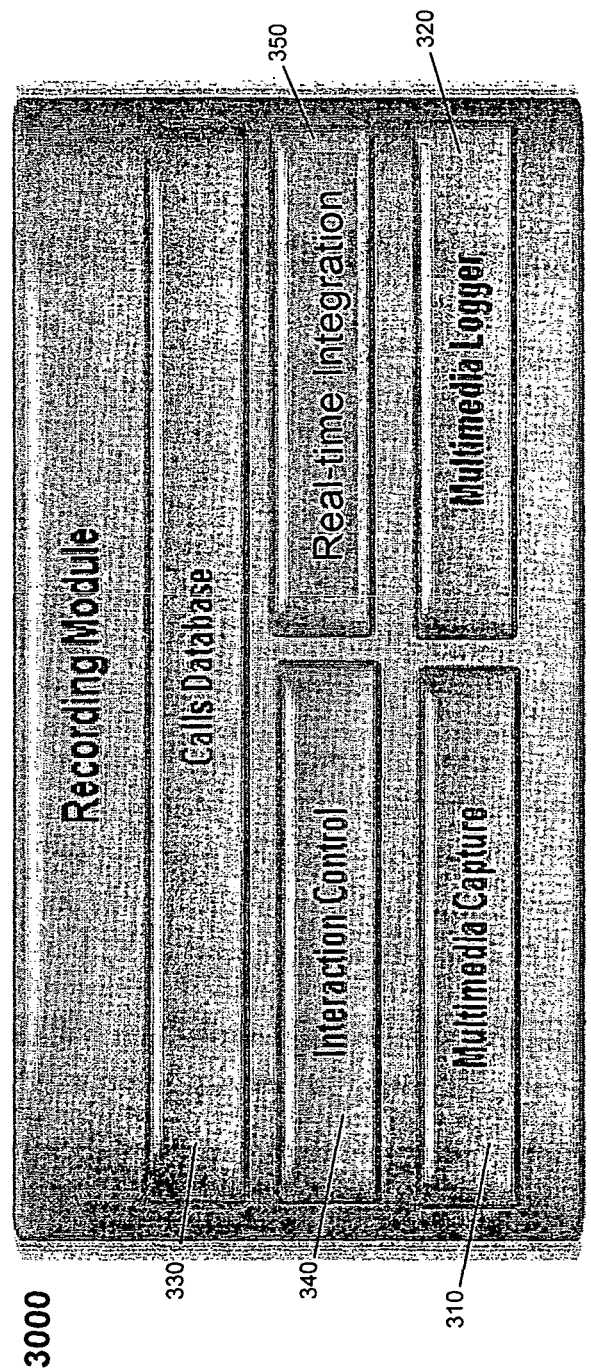
FIG. 3 is a block diagram illustrating a third apparatus for recording multi-party Internet Protocol (IP) sessions at a branch, according to a preferred embodiment of the present invention.

Reference is flow made to FIG. 3, which is a block diagram illustrating a third apparatus for recording multi-party Internet Protocol (IP) sessions at a branch, according to a preferred embodiment of the present invention.

Apparatus 3000 may be implemented as a recording module installed on a branch device, as described in further detail hereinabove.

The apparatus 3000 co-resides on the branch device, as described in further detail hereinabove.

Apparatus 3000 includes a data capturer 310, which is an IP Multimedia capture sub-module, which captures the media data of the multi-party IP session at the branch, as described in further detail hereinabove.

The media data may include, but is not limited to media data packets, media data files created in advance of the capturing and stored on devices, etc, as described in further detail hereinabove. For example, the media files may be recorded and stored by local devices such as a phone, a voice mail server, a gateway, etc.

The apparatus 3000 also includes a Multimedia logger sub module 320, which is used for short-term local storage of the media data captured by the IP Multimedia capture sub-module 310, before the media data is forwarded to a remote party, say a central recording system, as described in further detail hereinabove.

The apparatus 3000 also includes a calls database 330, for recording information pertaining to local IP session data (say phone call data) recorded by the apparatus 3000. For example, the call database 330 may be used for recording metadata based information pertaining to IP sessions.

The apparatus 3000 also includes an interaction control sub-module 340, which controls the recording of the data captured by the IP Multimedia capture sub-module 310, say using metadata such as CTI data, captured by the interaction control sub-module 340, as described in further detail hereinabove.

The apparatus 3000 further includes a real time integration module 350, which facilitates the recording of the data captured by the IP Multimedia capture sub-module 310, in real time.

The real time integration sub module 350 may use any of known in the art technologies and methods. For example, the real time integration sub module 350 may use Telephony Application Program Interface (TAPI).

Telephony Application Program Interface (TAPI) is programming interface that allows Windows client applications to access voice services on a server, say for accessing VoiP Telephony Services.

Figure 4:
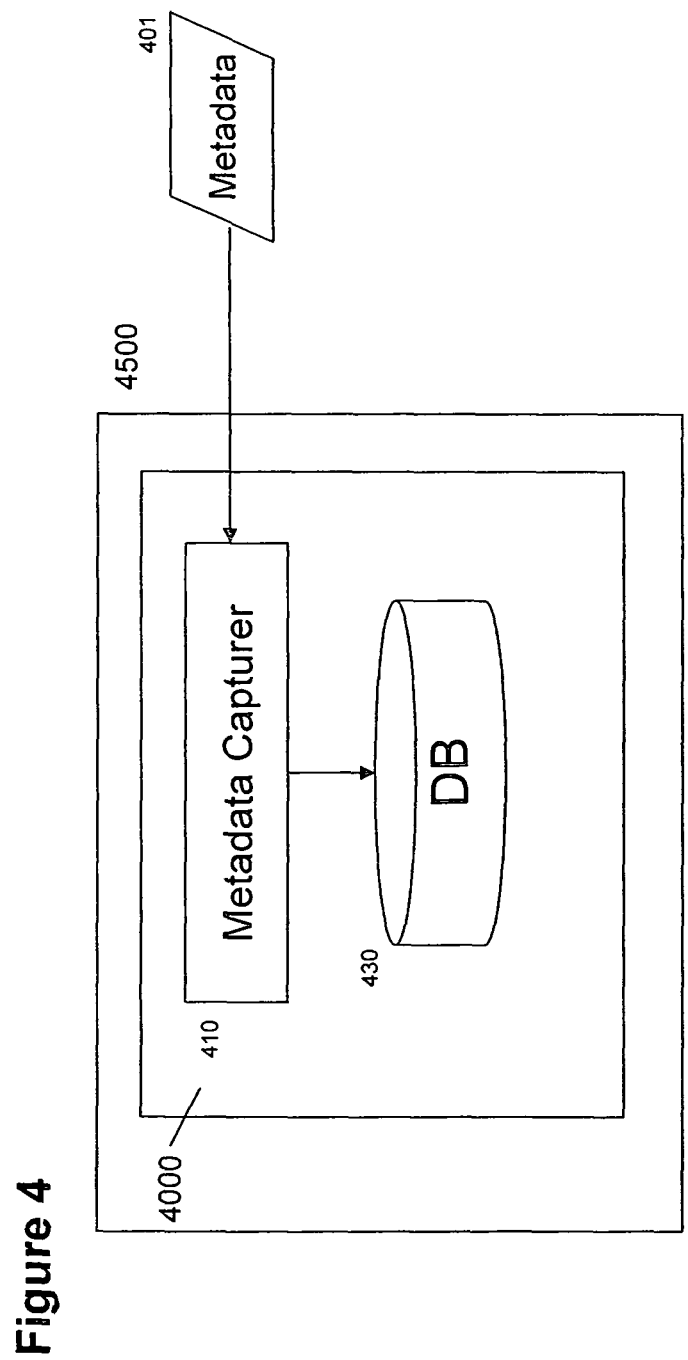
FIG. 4 is a block diagram illustrating a fourth apparatus for recording metadata of multi-party Internet Protocol (IP) sessions at a branch, according to a preferred embodiment of the present invention.

Reference is now made to FIG. 4, which is a block diagram illustrating a first apparatus, for recording metadata of multi-party Internet Protocol (IP) sessions at a branch, according to a preferred embodiment of the present invention.

Apparatus 4000 is deployed on a branch device 4500 on the communication branch.

The apparatus 4000 co-resides on the branch device 4500, and uses the device's chassis, user interfaces, etc, as described in further detail hereinabove.

For example, the apparatus 4000 may be deployed on a router or a media gateway, and implemented as a server blade, flash modules, etc., as described in further detail hereinabove.

Apparatus 4000 includes a metadata capturer 410.

The metadata capturer 410 captures metadata 401 pertaining to a multi-party IP session. For example, the metadata 401 may include (but is not limited to) Computer Telephone Integration (CTI) data relating to a multi-party IP session sent towards the metadata capturer 410 from a remote or local CTI server, as described in further detail hereinabove.

Preferably, the metadata capturer 410 also has the interaction controller 250 functionalities described in further detail hereinabove. For example, the metadata capturer 410 may use the metadata, to control the capturing and recording of media data by a capturer 210 and recorder 220, as described in further detail hereinabove The metadata capturer 410 may also record the metadata at the branch, say in a database 430.

Figure 5:
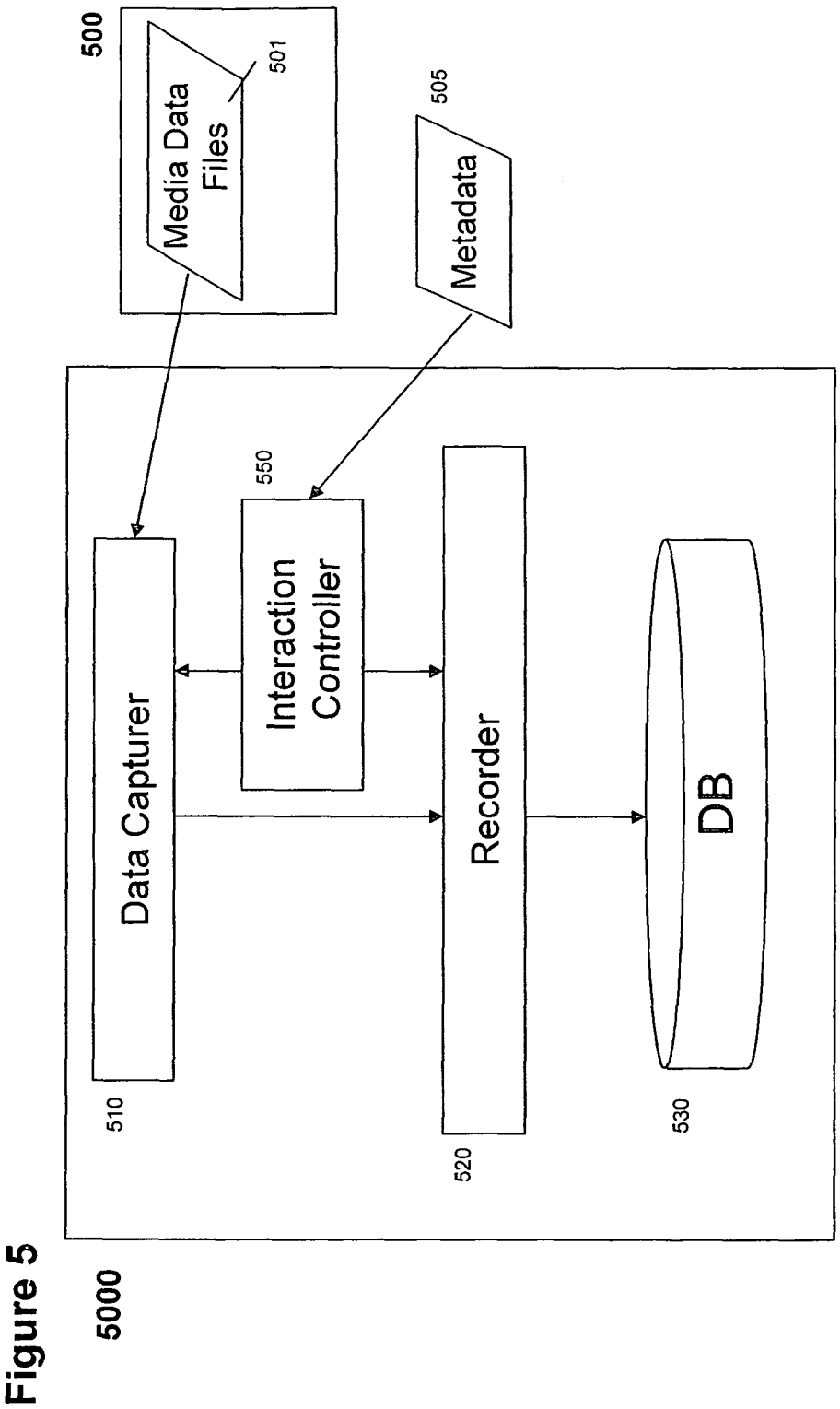
FIG. 5 is a block diagram illustrating a fifth apparatus for recording multi-party Internet Protocol (IP) sessions at a branch, according to a preferred embodiment of the present invention.

Reference is now made to FIG. 5, which is a block diagram illustrating a fifth apparatus for recording multi-party Internet Protocol (IP) sessions at a branch, according to a preferred embodiment of the present invention.

Apparatus 5000 is deployed on a branch device.

References herein to a branch device refer in fact to any network device, which is exposed to relevant data packets transmitted to and from a local network, say an Ethernet local network, as described in further detail hereinabove.

For example, the apparatus 5000 may be deployed on a branch device such as a router or a media gateway, and implemented as a server blade, flash modules, etc.

Preferably, the apparatus 5000 co-resides on the branch device. That is to say that the apparatus 5000 shares the same chassis and power supply with the branch device. Preferably, the apparatus 5000 and the branch device also share a common user interface for maintaining, monitoring, and alerting, thus lowering the footprint of the apparatus 5000.

By co-residing on the branch device, the apparatus 5000 has small footprint resultant on the simplicity and lightness of the apparatus 5000. The apparatus 5000 further provides low bandwidth—as the data is recorded locally, simplified connectivity requirements—as the apparatus 5000 uses the communication correctors of the existing branch device, enhanced security—utilizing security mechanisms the branch device is already installed with, ease of development, improved data security—as the data is automatically backed-up, etc.

The data capturer 510 captures media data files 501 recorded and stored in advance by local devices 500 such as a phone, a voice mail server, a gateway, etc, as known in the art.

The media data files 501 may include files which hold data streams of multi-party Internet Protocol (IP) sessions.

Optionally, the data capturer 510 further captures one or more media data packets of a multi-party Internet Protocol (IP) session involving the branch, such as Real-time transport protocol (RTP) data packets, as described in further detail hereinabove.

Apparatus 5000 may also include a recorder 520, deployed on the network device, and connected to the data capturer 510.

The recorder 520 receives one or more of the media data files 501 from the data capturer 510 and records the media data found in the media data files 501, say in a database 530, as described in further detail hereinbelow.

Preferably, the recorder 520 may interact with a remote receiver, such as a central recording device deployed at a central location and forward relevant parts of the recorded media data to a remote party.

Preferably, the recorder 520 uses a predefined protocol for forwarding the recorded media data to the remote party. Using the protocol, the recorded media data may be integrated with recorded data received by the remote party in previous interactions.

Preferably, apparatus 5000 also includes an interaction controller 550, connected to the data capturer 510 and the recorder 520.

The interaction controller 550 captures metadata 505. The interaction controller 550 uses the metadata 505 for controlling the capturing of the media data files 501 by the data capturer 510.

The interaction controller 550 also used the media data for controlling the recording and forwarding of the media data by the recorder 520, as described in further detail hereinabove.

For example, the interaction controller 550 may receive Computer Telephony Integration (CTI) data from a CTI server preprogrammed for sending the CTI data to the interaction controller 550.

Using the CTI data which comprises metadata pertaining to the media data files 501, the interaction controller 550 controls the capturing of the media data files by the data capturer 510, as well as the recording and forwarding of the media data to remote parties by the recorder 520, as described in further detail hereinabove.

Figure 6:
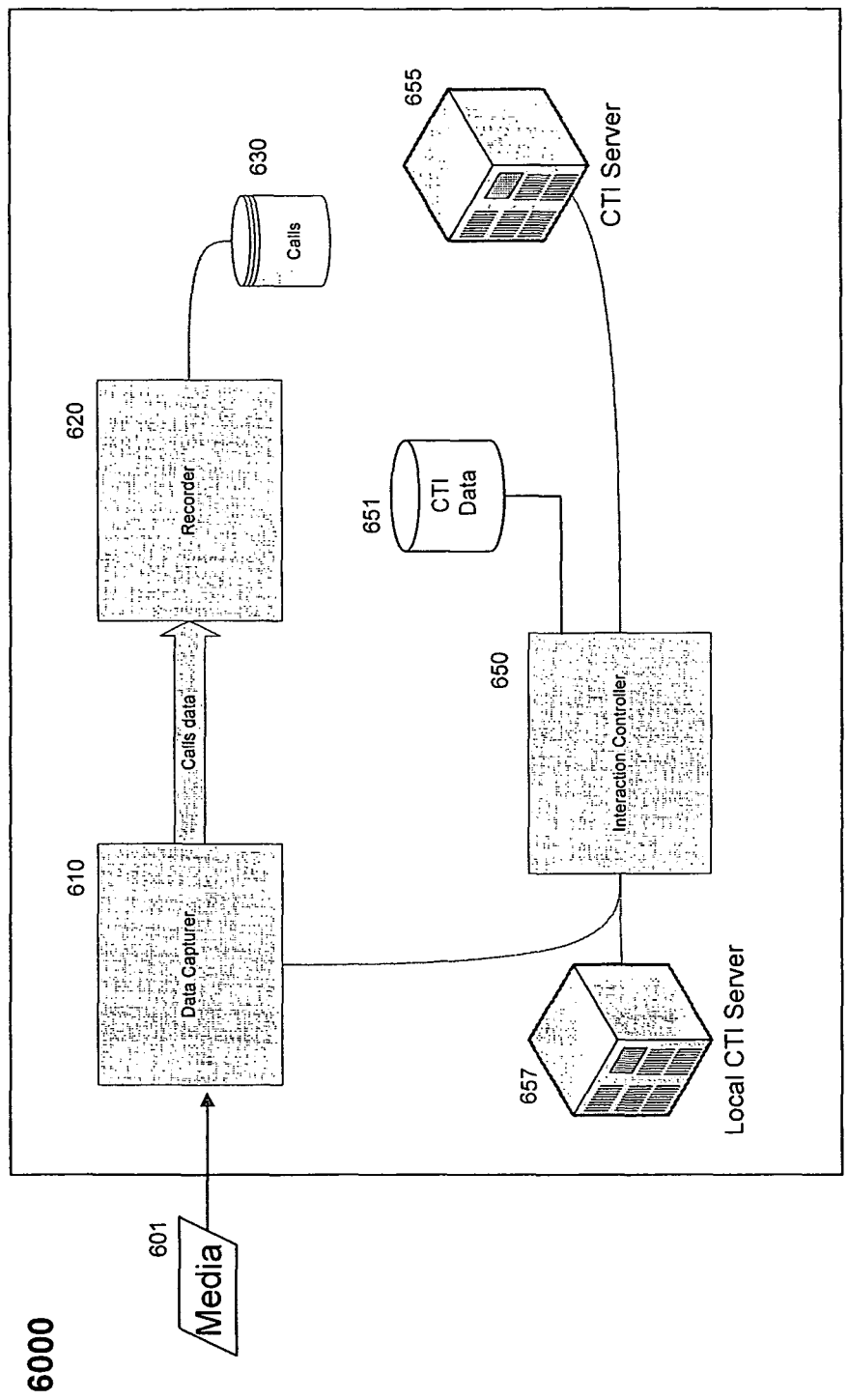
FIG. 6 is a block diagram illustrating a seventh apparatus for recording multi-party Internet Protocol (IP) sessions at a branch, according to a preferred embodiment of the present invention.

Reference is now made to FIG. 6, which is a block diagram illustrating a fourth apparatus for recording multi-party Internet Protocol (IP) sessions at a branch, according to a preferred embodiment of the present invention.

System 6000 includes a data capturer 610. The data capturer 610 is deployed on a branch device and co-resides on the branch device, as described in further detail hereinabove. For example, the data capturer 610 may be deployed on a router or a media gateway, and implemented as a server blade, as known in the art.

The data capturer 610 captures media data 601 of a multi-party Internet Protocol (IP) session involving the branch, such as Real-time transport protocol (RTP) data packets, or media data files, as described in further detail hereinabove.

The media data 601 may include, but is not limited to: voice, screen capture, instant messages, video, or any other media data, as known in the art.

The media data may be captured from different types of media devices, such as IP Phones (including Soft-phones), IP video cameras, desktop monitors, or any other media device, as known in the art.

Optionally, the media data packed is captured from media data packets, from media data files, or from a combination thereof, as described in further detail hereinabove.

System 6000 also includes a recorder 620. The recorder 620 is connected to the data capturer 610. The recorder 620 receives one or more of the captured media data from the data capturer 610 and records the media data, say in a database 630, as described in further detail herein above.

Apparatus 6000 also includes one or more interaction controller(s) 650.

The interaction controller 650 captures Computer Telephone Integration (CTI) data relating to a multi-party IP session, from a remote CTI server 655.

Preferably, interaction controller 650 further stores the captured CTI data in a database 651 as described in further detail hereinabove.

Preferably, the data the CTI server 655 is preprogrammed for retrieving the relevant CTI data from the server's dedicated databases. CTI control data, etc, as know in the art. The CTI server 655 sends the CTI data to the interaction controller 650.

The interaction controller 650 uses the CTI data pertaining to a media session, (say an IP media session used for video conferencing) for instructing the data capturer 610 to start and terminate the capturing of media data pertaining to the media session, as described in further detail hereinbelow.

Preferably, upon unintentional disconnection from the remote CTI server 655, the interaction controller 650 automatically switches to a local CTI server 657, until the connection to the remote CTI server 655 is recovered.

The interaction controller 650 uses CTI data received from the local CTI server, for controlling the capturing of media data by the data capturer 610, as described in further detail hereinabove.

That is to say that the interaction controller 650 establishes a connection with the remote CTI server 655, for receiving CTI data, as described in further detail hereinabove.

When the remote CTI server 655 unintentionally disconnects from the the interaction controller 650, the interaction controller 650 automatically switches to the local CTI server 657. By automatically switching to the local CTI server 657, the interaction controller 650 keeps capturing CTI data, even when the remote CTI server 655 is not available because of the unintentional disconnection.

When the connection to the remote CTI server 655 is recovered, the interaction controller 650 automatically switches back to the remote CTI server 655.

Optionally, the interaction controller 650 records the Computer Telephone Integration (CTI) data relating to the multi-party IP session.

Preferably, the interaction controller 650 also controls interaction of the recorder 620 with a remote party. The recorder 620 may use the interaction to forward recorded media data to the remote party, as described in further detail hereinabove.

Figure 7:
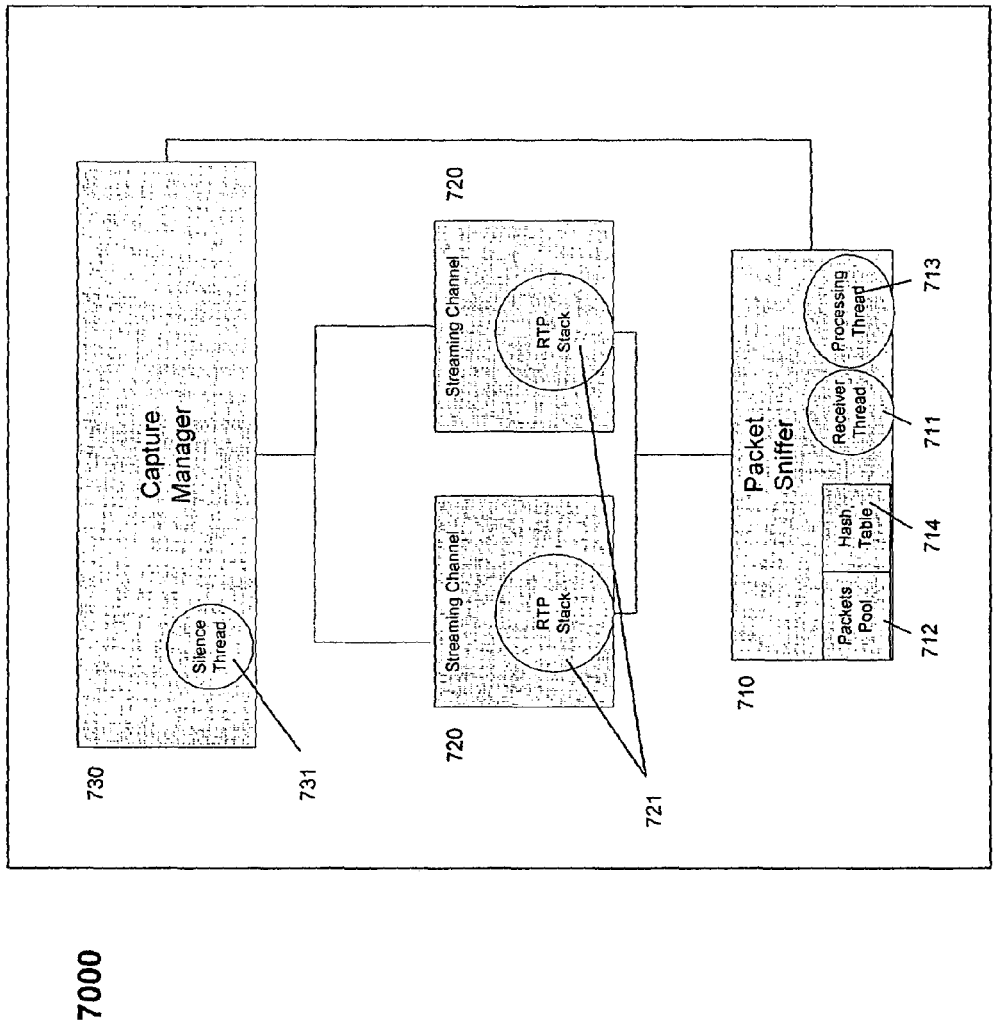
FIG. 7 is a block diagram illustrating a data capturer, using passive sniffing, according to a preferred embodiment of the present invention.

Reference is now made to FIG. 7, which is a block diagram illustrating a data capturer, using passive sniffing, according to a preferred embodiment of the present invention.

Data capturer 7000, which uses passive sniffing, may capture data packets from different types of media devices, including but not limited to: IP Phones (including Soft-phones), IP video cameras, etc.

The data capturer 7000 captures the data packets by passively sniffing the network traffic. For example, the data capturer 7000 may use one or more IP device(s) using raw sockets, for carrying out the passive sniffing, or access a network interface card (NIC) in a promiscuous mode, as known in the art.

A Raw Socket is an Operating System object (or interface) which provides the data packet (when the packet reaches the logger network card) without processing the data packet and without stripping network headers from the data packet.

On some operating systems such as Linux™ it can be used to receive all traffic that reaches a PC network card (even if the packet is not addressed to that specific PC).

The passive sniffing does not require the use of any Computer Telephony Integration (CTI).

The data capturer 7000 may be used to capture media data packets from any IP device which generates media data packets such as Real-time transport protocol (RTP) data packets, transmits media data packets, or both.

The data capturer 7000 includes a packet sniffer 710.

The packet sniffer 710 captures the media data packets by intercepting network traffic at the raw sockets. The packet sniffer 710 implements a receiver thread 711 for the raw socket.

The receiver thread 711 is a process which opens the raw socket and runs in a loop, where the receiver thread 711 reads the data packets from the raw socket. The raw socket allows the receiver thread 711 to receive data packets seen by a low-level interface card such as a Network Interface Card (NIC) associated with the raw socket, as described in further detail hereinabove.

The packet sniffer 710 includes a packet pool 712. The packet pool 712 is a pre-allocated memory area. The packet pool 712 is used for temporarily stoning the data packets received using the raw socket (from the NIC) until the packets are processed, as described hereinbelow.

The packet sniffer 710 also includes a Hash Table 714. The Hash table 714 holds IP addresses that are to be recorded, as predefined by a user or administrator.

The receiver thread 711, upon receiving the data packet, checks in the Hash Table 714 if the specific IP address should be captured.

Preferably, the Hash Table 714 also lists packet direction (incoming vs. outgoing) for each address, thus indicating for each address if the incoming data packets should be captured, outgoing packets should be captured, or both.

The packet sniffer 710 also implements a processing thread 713. The processing thread 713 activates the streaming channel 720 for reassembling the IP session from the data packets.

If the Hash Table 714 indicates that the packet should be captured, the receiver thread 711 notifies the processing thread 713 regarding the data packet. Otherwise, the packet is dropped and the packet memory is returned to the packet pool for reuse.

The processing thread 713 also uses the Hash Table 714.

The processing thread 713 uses the Hash Table 714 for selecting the relevant data packets for each IP session. The processing thread 713 pushes the data packets of the IP session to a streaming channel 720.

The streaming channel 720 is used for reassembling the IP session from the data packets forwarded to the channel 720. The reassembling of the data packets is needed because data packets are transmitted multiplexed via the socket.

After the reassembling of the packets, the processing thread 713 pushes the data packets memory back to the packet pool.

Each channel of the streaming channels 720 represents a single capture channel.

A capture channel represents a unidirectional IP session between two parties, and is used for recreating an IP session stream according to protocol in use.

For example, in a phone call between party A and party B, a capture channel may represent only data packets produced by party A. Other examples could be a fax machine sending a fax, video conferencing software residing on a PC of one of a video conference participators, etc.

The streaming channel 720 includes a stack for collecting and concatenating data packets of the single capture channel, where the data packets are transmitted multiplexed in the socket, so as to recreate the original data stream from the data packets.

An example of operation of the data capturer 7000 is as follows: an IP Call between a certain calling party A and a certain called party B is an IP session which may be assigned a two capture channel. One for media data streamed from party A to party B, and the other for the media data streamed from party B to party A.

The data packets of the IP session are received multiplexed through the raw socket. The data packets are received by the receiver thread 711.

Using the Hash Table 714, the receiving thread 711 determines if the packets should be captured and notifies the processing thread 713.

The processing thread 713 uses the hash table 714 again to find out for each packet, which is the streaming channel 720 responsible for the capture channel the packet originates from.

The streaming channel 720 is used for reassembling the session from the packets using the RTP stack 721, thus de-multiplexing the data packets received. That is to say the streaming channel 720 de-multiplexes and orders the data packets of the IP session in the RTP stack 721. The streaming channel 720 concatenates the data packets, so as to recover the original data steam of the phone call, as known in the art.

The data capturer 7000 also includes a capture manager 730.

The capture manager 730 manages the streaming channels 720, and may be used to configure each streaming channel to capture data packets of one or more IP addresses.

Preferably, the capture manager 730 implements a silence thread 731.

The silence thread 731 determines when the each streaming channel is silent.

The determination that the streaming channel is silent may be used by the capture manager 730, for determining when the session ends.

Optionally, the capture manager also forwards the recovered data stream from the streaming channel 720, for recording, as described in further detail hereinbelow.

Figure 8:
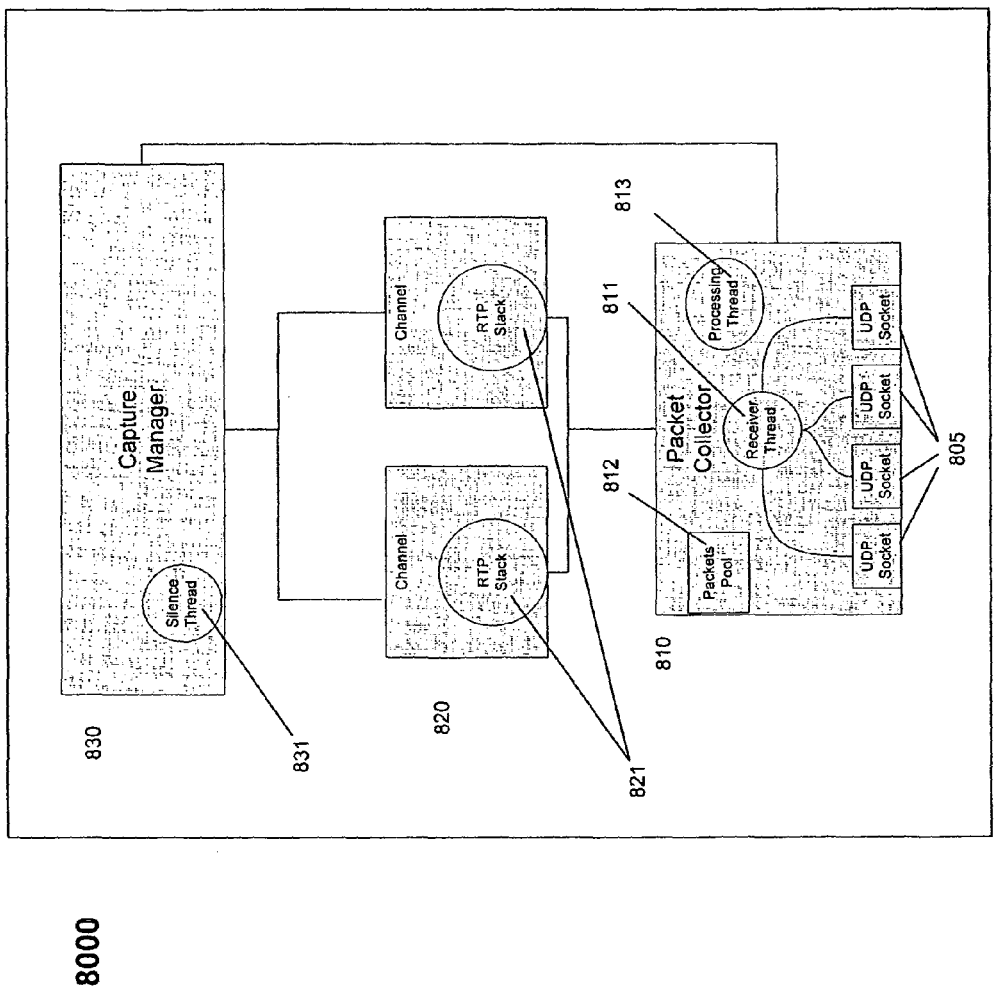
FIG. 8 is a block diagram illustrating a data capturer, using active sniffing, according to a preferred embodiment of the present invention.

Reference is now made to FIG. 8, which is a block diagram illustrating a data capturer, using active capturing according to an alternative embodiment of the present invention.

Data capturer 8000, which uses active capturing may capture data packets from different types of media devices, including but not limited to: IP Phones (including Softphones), IP video cameras, desktop monitors, etc.

The data capturer 8000 captures the data packets by actively listening for incoming network traffic.

The data capturer 8000 connects to the IP devices using pre-allocated User Datagram Protocol (UDP) sockets 805, for capturing the data packets.

User Datagram Protocol (UDP) is a protocol within the TCP/IP protocol suite that is used in place of TCP when a reliable delivery is not required. There is less processing of UDP packets than there is for TCP. UDP is widely used for streaming audio and video, voice over IP (VoIP) and video-conferencing where there is no time to retransmit erroneous or dropped packets.

If UDP is used and a reliable delivery is required, packet sequence checking and error notification must be written into the applications, as UDP does not use a handshake to start a session. It just sends out packets.

Data capturer 8000 includes a packet collector 810. The packet collector 810 captures UDP packets, by creating UDP sockets, and capturing network traffic from them.

The packet collector 810 includes a receiver thread 811. The receiver thread 811 listens to one or more UDP sockets 805, for data packet arrival, say using the epoll system call of the Linux Operating System Kernel 2.6, as known in the art.

The packet collector 810 also includes a packet pool 812. The packet pool 812 is a pre-allocated memory area. The packet pool 812 is used for temporarily storing the data packets received from the UDP sockets, while the packets are processed, as described hereinbelow.

The packet collector 810 also implements a processing thread 813.

The processing thread 813 sends each of the data packets to a streaming channel, for reassembling the IP session, as described in further detail hereinbelow.

The processing thread 813 pushes the processed data packet memory back to the packet pool.

The data capturer 8000 further includes one or more streaming channels 820. Each streaming channel 820 represents a single capture channel.

A capture channel is a source for obtaining an IP session between two or more parties, used for communication between the parties. For example, a capture channel may source a caller's PC wherefrom a phone call, which would be the session, is initiated. Other sources could be a fax machine, video conferencing software residing on a user's PC or a server, etc.

The streaming channel. 820 includes an RTP stack 821 used for collecting and concatenating data packets of the single capture channel The streaming channel 820 orders the data packets of the single capture channel in the RTP stack 821, according to the order of packets in each IP session. That is to say the streaming channel 820 concatenates the data packets, so as to recover the original data steam of the IP session (say the phone call), as known in the art.

The data capturer 8000 also includes a capture manager 830.

The capture manager 830 manages the streaming channels 820, and may be used to configure each streaming channel 820 to capture data packets of one or more IP addresses.

Preferably, the capture manager 830 implements a silence thread 831.

The silence thread 831 determines when the each streamlining channel 820 is silent. The determination that the streaming channel 820 is silent may be used by the capture manager 830, for determining when the session ends.

Optionally, the capture manager 830 also forwards the recovered data stream from the streaming channel 820, for recording, as described in further detail hereinbelow.

Figure 9:
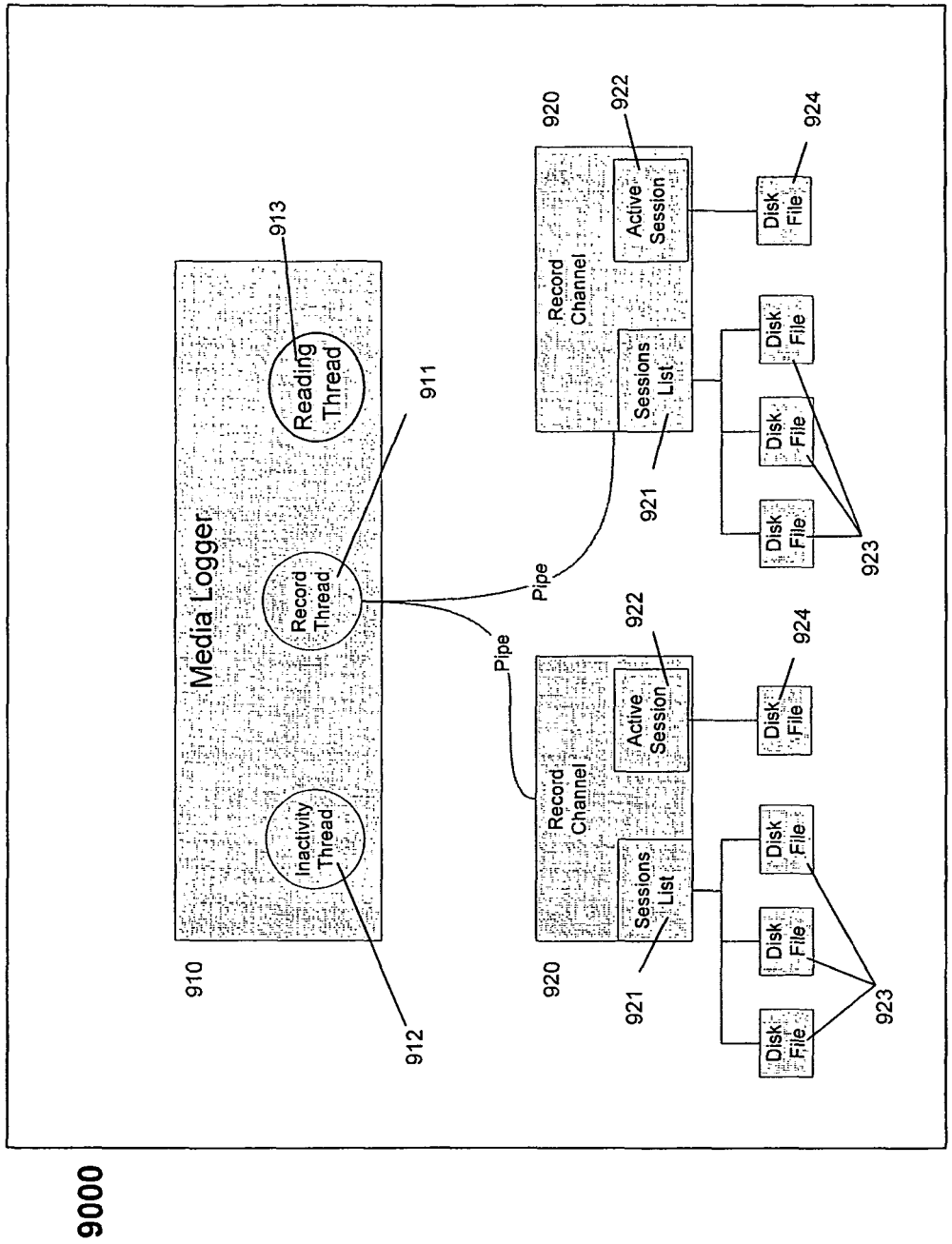
FIG. 9 is a block diagram illustrating a recorder, according to a preferred embodiment of the present invention.

Reference is now made to FIG. 9, which is a block diagram illustrating a recorder, according to a preferred embodiment of the present invention.

Recorder 9000 receives media data packets captured by the data capturer 220, as described in further detail hereinabove.

The recorder 9000 includes a media logger 910. The media logger 910 implements a record thread 911, which records the captured data packets using one or more record channel(s) 920.

Each record channel 920 is a logical entity representing a single capture channel.

A capture channel is a source for obtaining an IP session between two or more parties, used for communication between the parties. For example, a capture channel may source a caller's PC wherefrom a phone call, which would be the session, is initiated. Other sources could be a fax machine, video conferencing software residing on a user's PC or a server, etc, as described inn further detail hereinabove.

The record channel 920 is associated with a list of previously recorded sessions 921. The sessions originate from the capture channel (say a channel of a certain device such as an IP phone).

The record channel 920 is also associated with one or more active session indexes 922. Each active session index 922 is associated with an active IP session.

The list of previously recorded sessions 921 points to data files 923 used for storing the data captured by the data capturer 210 and forwarding the data to the recorder 9000.

Each of the active session indexes points to a data file 924 used for storing data of an active IP session. The data of the active IP session may be captured by a data capturer, as described in further detail hereinabove.

When a new session (such as an IP phone call) starts, the media logger 910 allocates a new file 924 on a disk, or any other data storage device, as known in the art. The media logger 910 also allocates an active session index 924, which points to the new file 924. When the data is received by the media logger 910, the media logger 910 pushes the data to the record channel 920. Optionally, the data is pushed to the record channel 920. The record channel 920 writes the data to the pipe (say a Linux pipe, as know in the art) The media logger 910 also contains a record thread 911.

The record thread 911 checks for data arrival in the record channel 920 data pipes, say using the epoll system call of the Linux Operating System Kernel 2.6, as known in the art.

When data arrives on the record channel 920's pipe, the record thread 911 writes the data to the new file 924 pointed by the active session index 924.

Optionally, the record thread 911 may perform some additional data processing, like transcoding, encrypting, etc, as described in further detail hereinabove.

Preferably, the files 923-924 of each specific record channel 920 are stored in a subdirectory allocated for the specific record channel 920.

Optionally, the record thread 911 names the subdirectories and files according to a naming convention using a unique number assigned to each record channel, say by the record thread 911.

The naming convention may further use a number unique within the record channel 920, where the unique number is assigned to each session, by the record thread 911. The naming convention identifies channel-session relationships.

For example, the record thread 911 may name a subdirectory allocated for a first record channel: '/1'. Then, the record thread 911 may name a file used for recording the first session of the first channel: '/1/1', a file used for recording a second session recorded for the first channel: '/1/2', etc.

Preferably, the media logger 910 may also implement an inactivity thread 912.

The inactivity thread 912 ends the recording of the session when no data arrives at the capture channel for a predetermined period, say seven seconds.

For example, the inactivity thread 912 may run in a loop and sample the record channel 920 each second.

When the inactivity thread 912 determines that the record channel 920 is silent, for example when no data is found in the record channel 920 for seven seconds, the inactivity thread 912 triggers the closing of the active session's file 924 by the record thread 911.

The record thread 911 closes the file 924, and updates the list of previously recorded sessions 921 of the record channel 920, so as to have the file pointed by the list 921. The record thread 911 may further nullify the active session index 922, and the index 922 no longer points to the file of the session just closed.

Preferably, the media logger 910 may further implement a reading thread 913 allocated for each specific record channel.

The reading thread 913 reads a single session's file 923, and forwards the data in the file 923, to a remote party, as described in further detail hereinabove.

Figure 10:
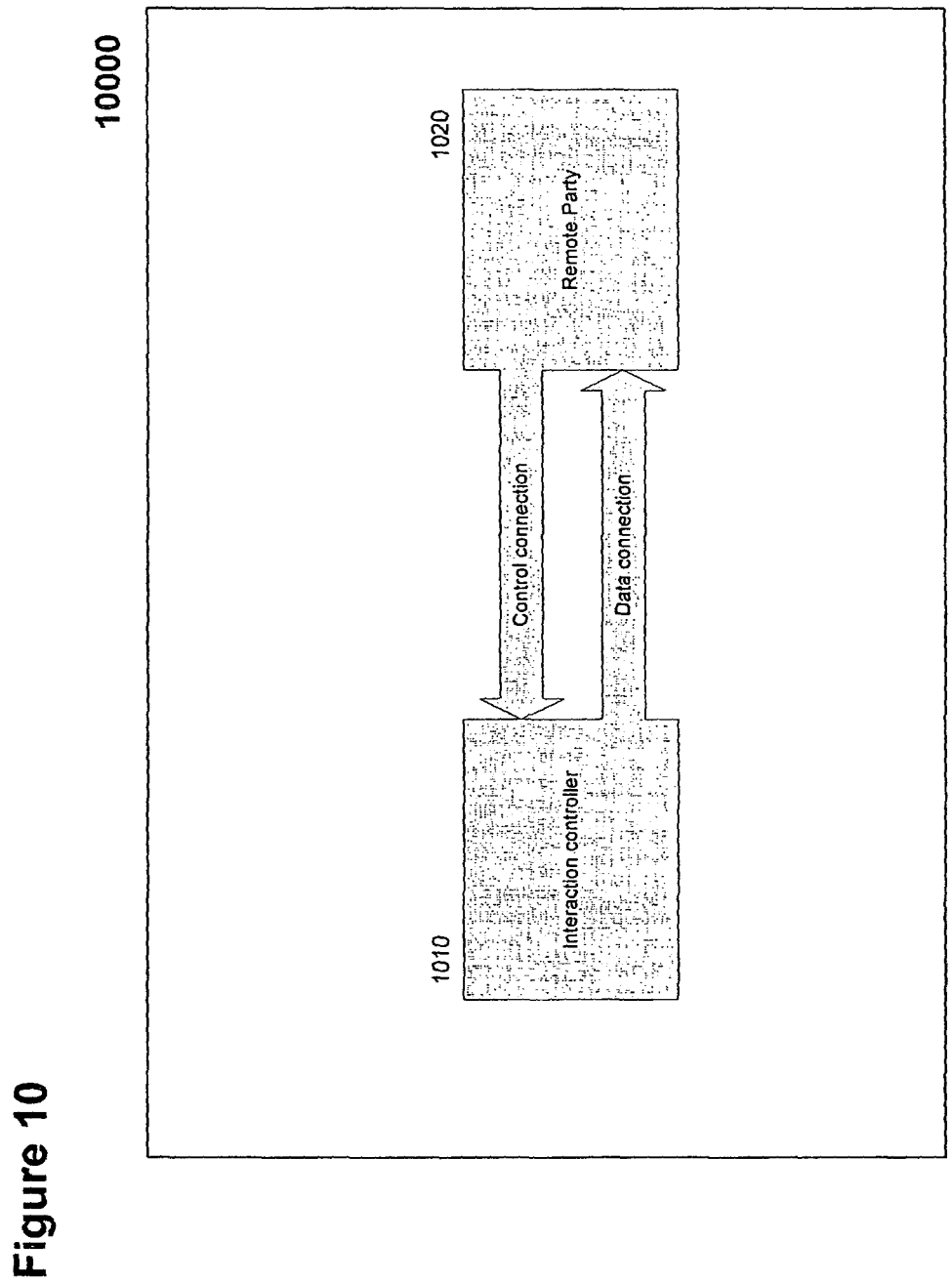
FIG. 10 is a block diagram illustrating an interaction controller, according to a preferred embodiment of the present invention.

Reference is now made to FIG. 10, which is a block diagram illustrating an interaction controller interacting with a remote party according to a preferred embodiment of the present invention.

Interaction controller 1010 facilitates and controls interactions between the recorder and a remote party 1020, as described in further detail hereinabove.

Optionally, the interaction controller 1010 controls the interaction using a Transmission Control Protocol (TCP) socket. A Transmission Control Protocol (TCP) socket is a TCP protocol based bi-directional communication channel.

Preferably, the interaction controller 1010 includes a communication manager. The communication manager creates a server thread at the side of the branch device installed with the recorder 9000 and data capturer 7000 (or 8000).

The server thread listens to incoming connections, say from the remote party 1020 who asks for data stored by the recorder 9000, or who wants to administrate/configure the data capturer, 7000 (or 8000).

When a connection arrives, the communication manager creates a communication client object. The communication client object handles the specific communication with the specific remote party.

The communication client raises a thread for controlling the interaction, say between the recorder 9000 and the remote party 1020.

The connection controlled by the thread is a control connection used for receiving request of the remote party to receive media data, such as a video data stream of a certain IP session.

The communication client also establishes a TCP connection back to the remote party 1020.

The second TCP connection facilitates interaction between the recorder 9000 and the remote party 1020. The second connection is a data connection used by the recorder 9000 for forwarding recorded data to the remote party 1020, as described in further detail hereinabove.

Figure 11:
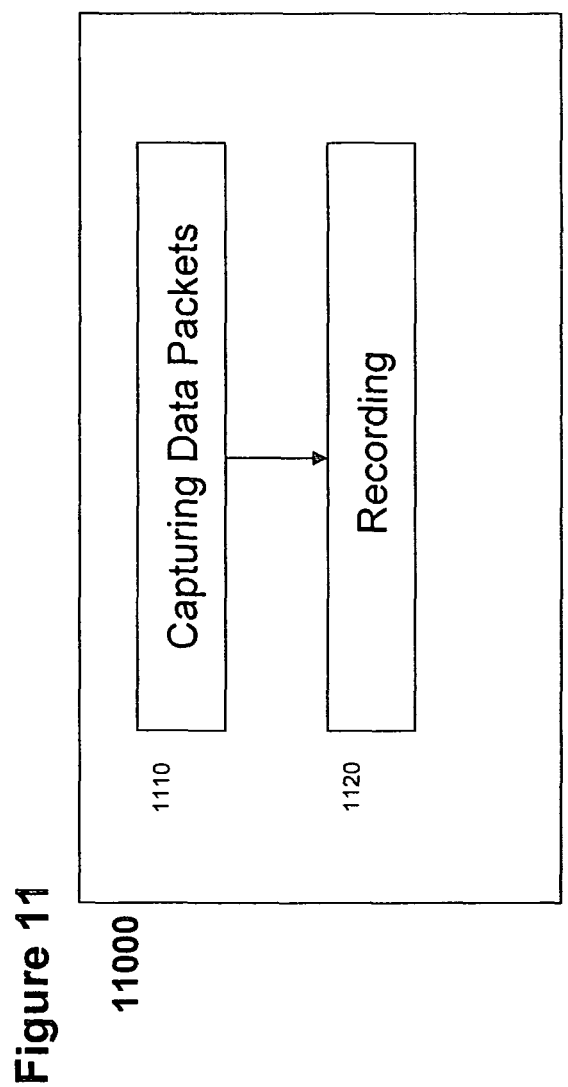
FIG. 11 is a flowchart illustrating a first method for recording multi-party Internet Protocol (IP) sessions at a branch, according to a preferred embodiment of the present invention.

Reference is now made to FIG. 11, which is a flowchart illustrating a first method for recording multi-party Internet Protocol (IP) sessions at a branch, according to a preferred embodiment of the present invention.

A method 11000 for recording multi-party Internet Protocol (IP) sessions at a branch may be implemented on a branch device at the branch, as described in further detail hereinabove.

In accordance with method 11000, one or more data packets of a multi-party IP session involving the branch are captured 1110, say using a data capturer 110, as described in further detail hereinabove.

The data packets 101 may include, but are not limited to media data packets such Real-time transport protocol (RTP) data packets, bearing media data such as: voice, screen capture, instant messages, video, or any other rich media, as known in the art.

Next, at least one of the captured data packets are recorded at the branch, say using a recorder 120, as described in further detail hereinabove.

Optionally, the recorder 120 receives one of more of the captured data packets from the data capturer 110. The recorder 120 records the received data packets at the branch, say in a database 130, as described in further detail hereinabove.

Figure 12:
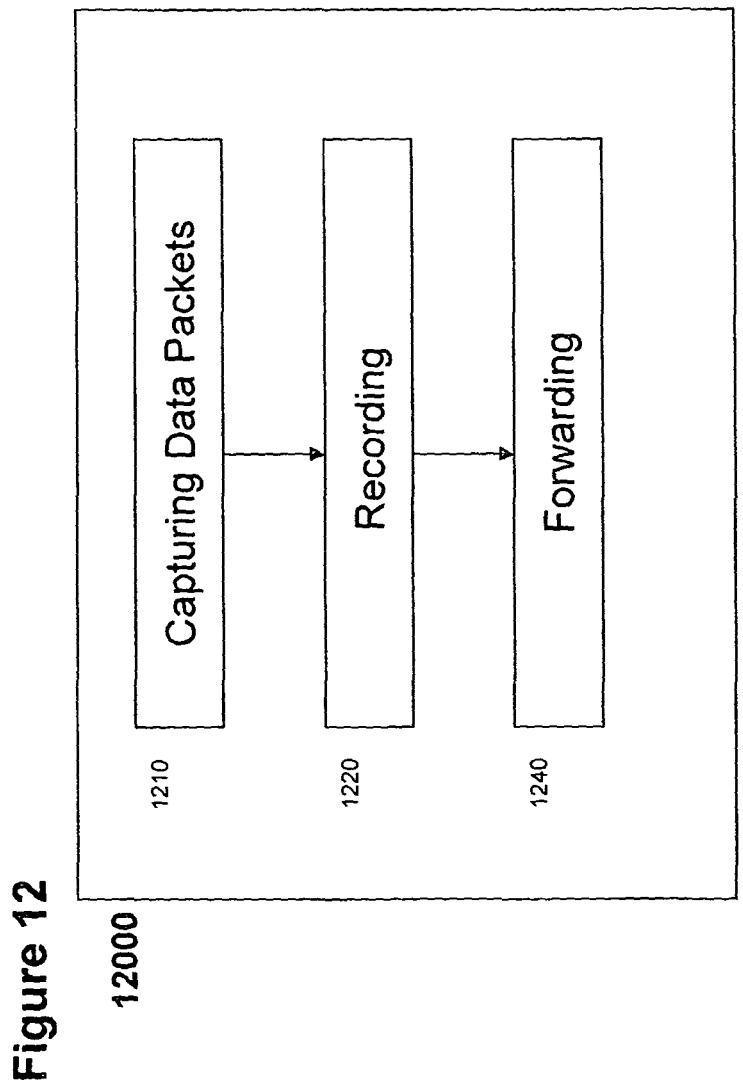
FIG. 12 is a flowchart illustrating a second method for recording multi-party Internet Protocol (IP) sessions at a branch, according to a preferred embodiment of the present invention.

Reference is now made to FIG. 12, which is a flowchart illustrating a second method for recording multi-party Internet Protocol (IP) sessions at a branch, according to a preferred embodiment of the present invention.

A method 12000 for recording multi-party Internet Protocol (IP) sessions at a branch, may be implemented on a branch device, as described in further detail hereinabove.

In accordance with method 12000, one or more data packets of a multi-party IP session involving the branch are captured 1210, say using a data capturer 110, as described in further detail hereinabove.

The data packets may include, but are not limited to media data packets such as Real-time transport protocol (RTP) data packets bearing media data such as voice, screen capture, instant messages, video, or any other rich media, as known in the art.

The data packets are recorded 1220, say using a recorder 120, as described in further detail hereinabove.

Preferably, one or more of the recorded data packets may be forwarded 1240 to a remote party. For example, the recorder 1220 may be connected to a remote party, using an interaction manager 250, as described in further detail hereinabove.

Preferably, the forwarding of the data packets is carried out according to a predefined protocol, as known in the art. Using the protocol, the data packets are integrated with recorded data received by the remote party in previous interactions.

Figure 13:
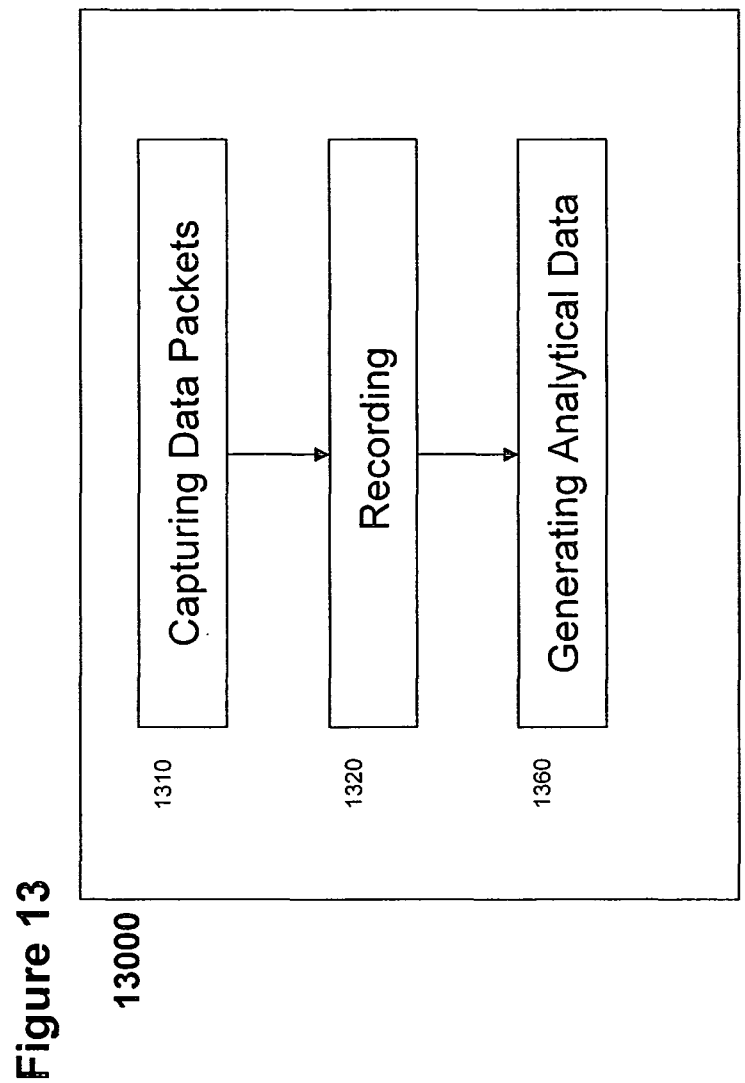
FIG. 13 is a flowchart illustrating a third method for recording multi-party Internet Protocol (IP) sessions at a branch, according to a preferred embodiment of the present invention.

Reference is now made to FIG. 13, which is a flowchart illustrating a third method for recording multi-party Internet Protocol (IP) sessions at a branch, according to a preferred embodiment of the present invention.

A method 13000 for recording multi-party Internet Protocol (IP) sessions at a branch may be implemented on a branch device, as described in further detail hereinabove.

In accordance with method 1300, one or more data packets of a multi-party IP session involving the branch are captured 1310, say using a data capturer 210, as described in further detail hereinabove.

The data packets may include, but are not limited to media data packets such as Real-time transport protocol (RTP) data packets, bearing media data such as: voice, screen capture, instant messages, video, or any other rich media, as known in the art.

The data packets are recorded 1320, say using a recorder 220, as described in further detail hereinabove.

Method 13000 also includes generating analytical data pertaining to the recording of the data packets at the branch, say using the analytical data generator 270, as described in further detail hereinabove.

Preferably, the analytical data is generated in real time. For example, the the analytical data may pertain to an active IP telephony call, which exceeds a duration limit predefined by an administrator of the apparatus 2000.

Preferably, the analytical data is forwarded to a remote party, say using an interaction managed between the analytical data generator 270 and the remote party using the interaction manager, as described in further detail hereinabove.

Figure 14A:
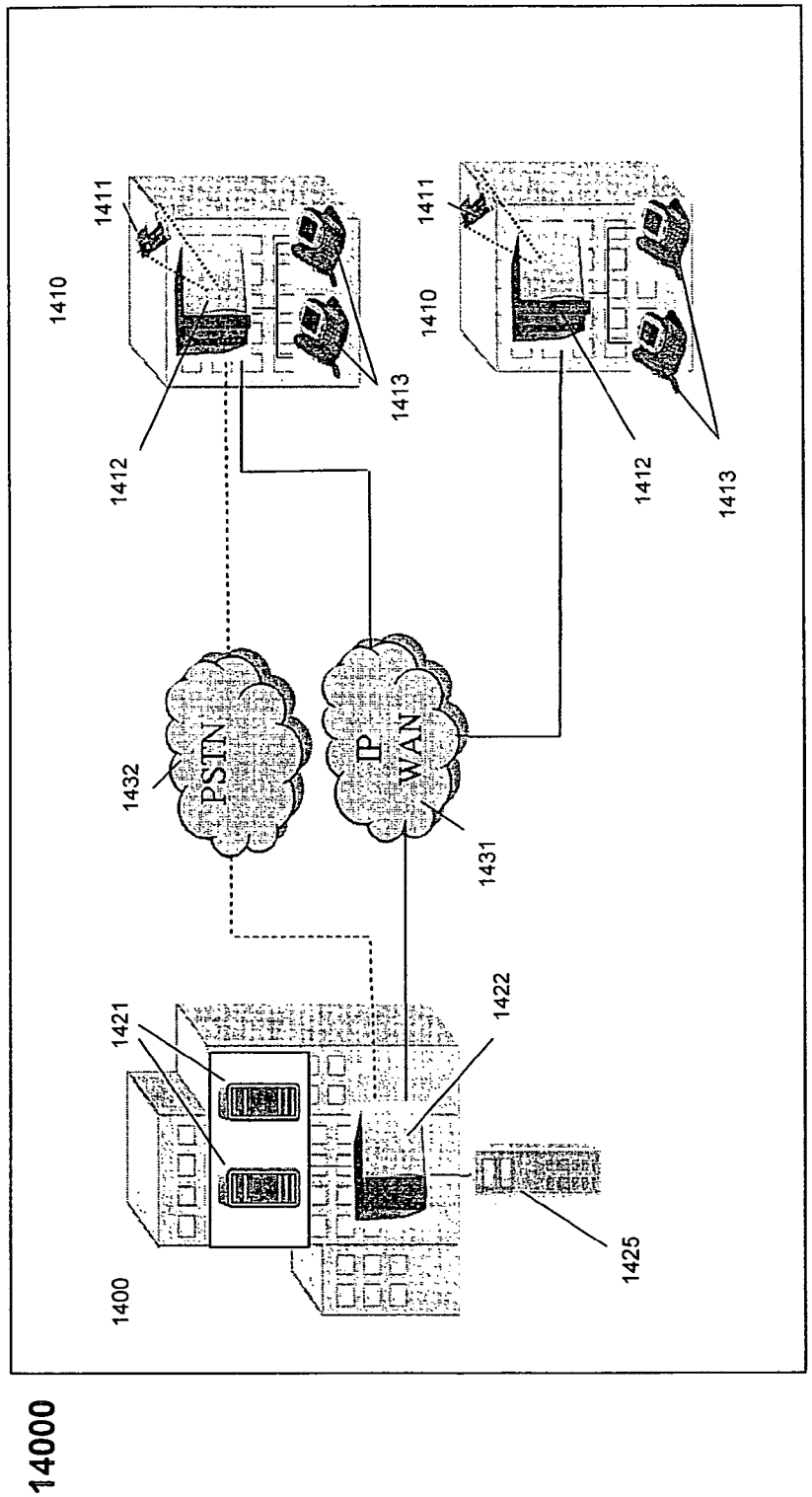
FIG. 14a is a second block diagram illustrating a first architecture for a system for recording multi-party Internet Protocol (IP) sessions at branches, according to a preferred embodiment of the present invention.

Reference is now made to FIG. 14a, which is a first block diagram illustrating an architecture for a system for recording multi-party Internet Protocol (IP) sessions at branches, according to a preferred embodiment of the present invention.

In architecture 14000, at each of two branches 1410 there is installed an apparatus 1411, on a branch device 1412, as described in further detail hereinabove.

The apparatus 1411 is implemented as a recording module, for recording multi-party Internet Protocol (IP) sessions at the branch, say IP phone calls involving IP phone devices 1413 connected to the branch device in a local network, as described in further detail hereinabove.

Each of the recording modules 1411 captures and records media data such as Internet Protocol (IP) session multimedia data packets, at the branch 1410 where the recording module is installed.

The recording module 1411 co-resides on the branch device's blade, and uses the chassis of branch device 1412, etc., as described in further detail hereinabove.

The recording module 1411 forwards the recorded data to a remote party such as a recording system 1425, deployed at a remote site 1420 (say a data center, as known in the art). At the remote party there may be used a gateway 1422—for receiving the recorded data, call control servers 1421—for managing the call recording, etc, as known in the art.

The recording module 1411 may use an IP Wide Area Connection (WAN) network 1431, for forwarding the data recorded locally at the branch to the recording system 1425, as known in the art.

Preferably, additional features such as optimization of network bandwidth consumption, recording backup and survivability, security, encryption services, etc. are provide by one or more components, as known in the art.

The recording module 1411 may forward the data to the remote party in real time, at a predefined low network utilization periods (off hours), or according to any other schedule predefined by a user or operator of the recording module 1411.

The recording module pushes the data to the remote party (say the recording system 1412). The remote party uses the data for archiving, application use, etc.

Preferably, the recording module 1411 forwards the data to a remotely located central recorder, deployed at a central location.

There may also be implemented a multi site recording system with several remote recorders, where each remote recorder receives data from one or more of the recording modules 1411.

Figure 14B:
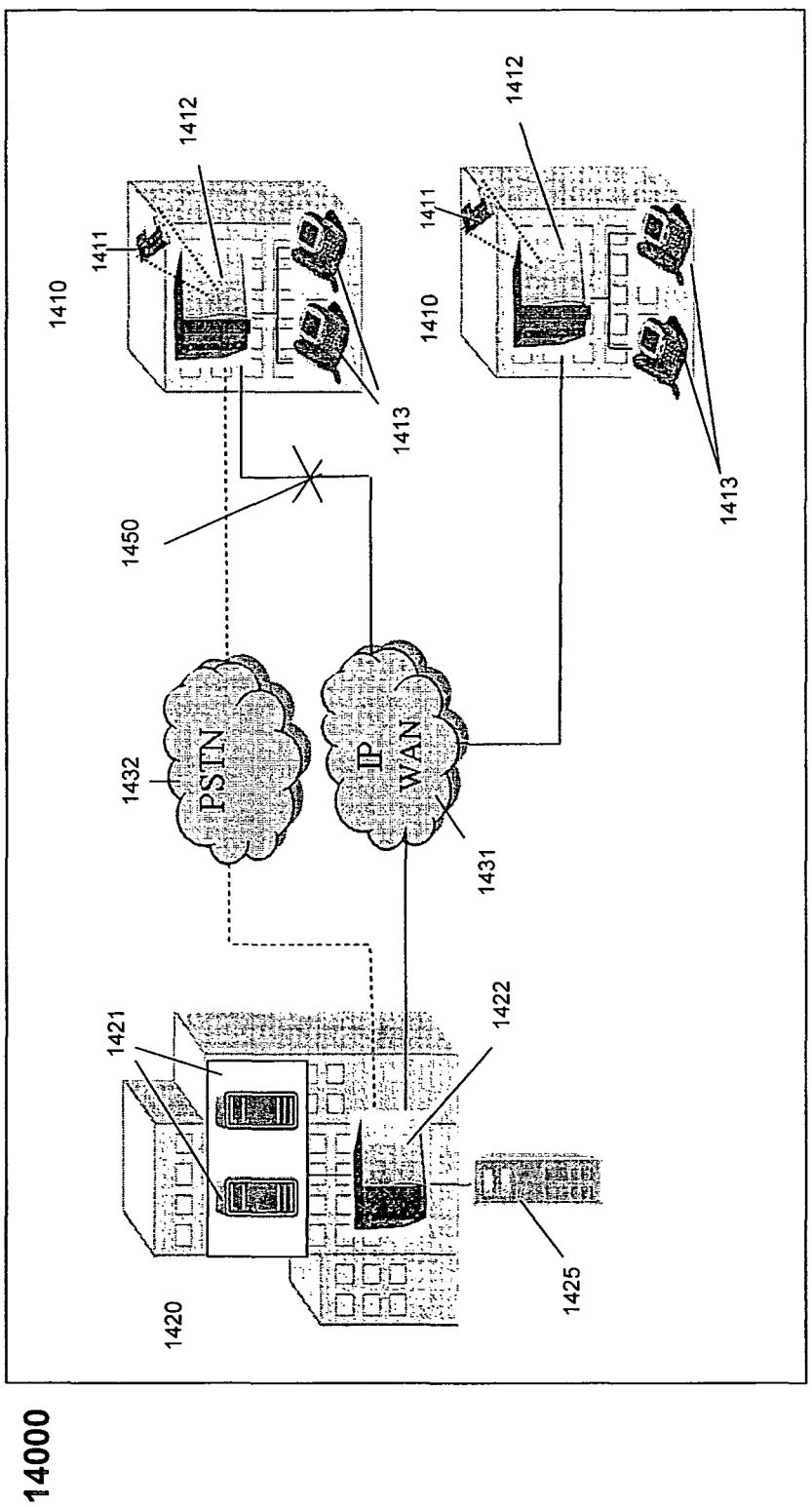
FIG. 14b is a second block diagram illustrating a second architecture for a system for recording multi-party Internet Protocol (IP) sessions at branches, according to a preferred embodiment of the present invention.

Reference is now made to FIG. 14b, which is a second block diagram illustrating an architecture for a system for recording multi-party Internet Protocol (IP) sessions at branches, according to a preferred embodiment of the present invention.

The architecture 14000 further allows handling of network disconnection or shortage of bandwidth (as a result of high bandwidth utilization) that may occur, say when using the IP WAN network 1431.

Optionally, during network disconnection 1450 or shortage of bandwidth, the recording module 1411 takes over recording the captured data locally at the branch. The data is buffered by the recording module 1411. When the disconnection or shortage ends, the buffered data is forwarded by the recording module 1411 to the recording system 1425, as described in further detail hereinabove.

The recording module 1411 continues to work with a local CTI or sniff the signaling for recording control.

Optionally, the recording module 1411 also captures Computer Telephony Integration (CTI) data from a central CTI, and forwards the data to the recording system 1425.

Preferably, upon a network disconnection or shortage of bandwidth, the recording module 1411 assumes recording control within the local media gateway and switches to a local CTI server, as described in further detail hereinabove.

Table 1 shows the differences between capabilities provided by preferred apparatus 1000 in connected and disconnected branch conditions.

TABLE 1

| Mode | Feature |
|---|---|
| Connected branch | Multimedia recording |
| | Total recording |
| | Selective recording |
| | QA recording |
| | Full application usage |
| | Store and forward of recorded media during offline periods |
| Disconnected branch | Multimedia recording |
| | Total recording |
| | Selective recording - optional |
| | QA recording - optional (based on Local Call Control and a local CTI Server) |
| | Buffering of recorded media |

Table 2 lists expected requirements for implementing an apparatus 1000, according to a preferred embodiment of the present invention.

TABLE 3

| Description | Requirement |
|---|---|
| CPU | 1.6 Ghz for 100 RTP streams without transcoding Additional 10% for AES encryption |
| Memory | 512 MB |
| Hard drive | 20 GBytes for 100 agent Multimedia interactions per day |
| Bandwidth | 10-20 Kbps per G.729 stream |
| | 10-20 Kbyte/Sec per screen stream |

It is expected that during the life of this patent many relevant devices and systems will be developed and the scope of the terms herein, particularly of the terms "CTI", "WAN", "IP", "Session", "Multimedia", and "Data Packets", and is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for recording multi-party Internet Protocol (IP) sessions at a telecommunications branch having an existing branch device associated therewith, the apparatus comprising:
   a data capturer, configured to capture at least one data packet of a multi-party IP session involving the branch;
   a recorder, associated with said data capturer, and configured to receive at least one of said captured data packets from said data capturer and to carry out local branch recording of said received data packets, the apparatus being deployed on said existing branch device; and
   an interaction controller, associated with said recorder, configured to control interaction of said recorder with at least one remote party, wherein said recorder is further configured to forward at least one of said recorded data packets to said remote party, upon recovering from a network disconnection;
   wherein the interaction controller, associated with said data capturer, is configured to capture metadata and control interaction of said data capturer with at least one device, according to said captured metadata; and
   wherein said metadata comprises Computer Telephony Interaction (CTI) data, and said interaction controller is further configured to capture said Computer Telephony Interaction (CTI) data from at least one CTI Server and control interaction of said data capturer with at least one device, according to said captured CTI data.

2. The apparatus of claim 1, wherein said captured data packets are media data packets.

3. The apparatus of claim 1, wherein said data capturer is further configured to capture media data files from at least one device and said recorder is further configured to receive said media data files and carry out local branch recording of media data originating from said media data files.

4. The apparatus of claim 1, wherein said data capturer is further configured to select at least one of said captured data packets according to a predefined policy, and forward said selected captured data packet to said recorder.

5. The apparatus of claim 1, wherein said data capturer is further configured to capture said data packets from at least one raw socket.

6. The apparatus of claim 1, wherein said data capturer is further configured to capture said data packets from at least one User Datagram Protocol (UDP) socket.

7. The apparatus of claim 1, wherein said data capturer is further configured to forward said captured data packet to said recorder only if said captured data packet originates from a predefined IP address.

8. The apparatus of claim 1, wherein said data capturer is further configured to forward said captured data packet to said recorder only if said captured data packet is a non-silent data packet.

9. The apparatus of claim 1 wherein said recorder is further configured to use a buffer of a predefined size, for said recording.

10. The apparatus of claim 1, wherein said recorder is further configured to save at least one of said data packets in a storage pre-allocated for a capture channel said data packet originates from.

11. The apparatus of claim 1, wherein said interaction controller is further configured to switch between at least two CTI servers, according to a predefined policy, for capturing said CTI data.

12. The apparatus of claim 1, wherein the interaction controller, associated with said data capturer, configured to control interaction of said data capturer with at least one device, wherein said data capturer is further configured to use said interaction to capture said data packets.

13. The apparatus of claim 1, wherein the interaction controller, associated with said recorder, configured to control interaction of said recorder with at least one remote party, wherein said recorder is further configured to use said interaction to forward at least one of said recorded data packets to said remote party.

14. The apparatus of claim 1, wherein the interaction controller, associated with said recorder, configured to control interaction of said recorder with at least one remote party, using a communication client object.

15. The apparatus of claim 1, wherein the interaction controller, associated with said recorder, configured to control interaction of said recorder with at least one remote party, wherein said recorder is further configured to use said interaction to forward at least one of said recorded data packets to said remote party, in real time.

16. The apparatus of claim 1, wherein the interaction controller, associated with said recorder, configured to control interaction of said recorder with at least one remote party, wherein said recorder is further configured to use said interaction to forward at least one of said recorded data packets to said remote party, according to a predefined policy.

17. The apparatus of claim 1, wherein the interaction controller, associated with said recorder, configured to control interaction of said recorder with at least one remote party, wherein said recorder is further configured to use said interaction to forward at least one of said recorded data packets to said remote party, upon detecting a termination of said multi-party IP session.

18. The apparatus of claim 1, wherein the interaction controller, associated with said recorder, configured to control interaction of said recorder with at least one remote party, wherein said recorder is further configured to use said interaction to forward at least one of said recorded data packets to said remote party, using a predefined protocol.

19. The apparatus of claim 1, wherein the interaction controller, associated with said recorder, configured to control interaction of said recorder with a remote central party, wherein said recorder is further configured to use said interaction to forward at least one of said recorded data packets to said remote central party, according to a predefined policy.

20. The apparatus of claim 1, further comprising an analytical data generator, associated with said recorder, configured to generate analytical data pertaining to said recording of said data packets at the branch.

21. The apparatus of claim 1, further comprising an analytical data generator, associated with said recorder, configured to generate in real time analytical data pertaining to said recording of said data packets at the branch.

22. The apparatus of claim 1, wherein the apparatus utilizes a chassis of said existing branch device.

23. The apparatus of claim 1, wherein the apparatus utilizes a power supply of said existing branch device.

24. The apparatus of claim 1, wherein the apparatus utilizes a user interface of said existing branch device.

25. The apparatus of claim 1, wherein said recorder is further configured to record said metadata relating to said multi-party IP session.

26. Method for recording multi-party Internet Protocol (IP) sessions at a telecommunications branch having an existing branch device associated therewith, the method comprising:
    capturing, by a data capturer, at least one data packet of a multi-party IP session involving the branch;
    receiving, by a recorder, associated with said data caputurer, at least one of said data packets from said data caputurer and recording at least one of said captured data packets at the branch; and
    interacting with at least one remote party, for forwarding at least one of said recorded data packets to said remote party, upon recovering from a network disconnection;
    wherein said capturing comprises capturing metadata relating to said multi-party IP session and using said captured metadata for said capturing said data packets and
    interacting with at least one remote CTI server, for capturing said Computer Telephone Integration (CTI) data, and upon unintentional disconnection from said remote CTI server, interacting with a local CTI server, for capturing said Computer Telephone Integration (CTI) data relating to said multi-party IP session from a local CTI server.

27. The method of claim 26, wherein said recording comprises saving at least one of said data packets in a storage pre-allocated for a capture channel said data packet originates from.

28. The method of claim 26, further comprising generating analytical data pertaining to said recording of said data packets at the branch.

29. The method of claim 26, further comprising generating in real time analytical data pertaining to said recording of said data packets at the branch.

30. The method of claim 26, wherein said capturing comprises capturing metadata comprising Computer Telephone Integration (CTI) data relating to said multi-party IP session and using said captured metadata for said capturing said data packets.

31. The method of claim 26, wherein said recording comprises recording said metadata relating to said multi-party IP session.

32. The method of claim 26, further comprising interacting with at least one remote party, for forwarding at least a part of said captured metadata to said remote party.

33. System for recording multi-party Internet Protocol (IP) sessions at a plurality of branches, each of the branches having a respective existing branch device, the system comprising:
   at least one data capturer, deployed on a respective one of said existing branch devices, and configured to capture at least one data packet of a multi-party IP session involving the branch;
   at least one branch recorder, deployed on said branch device, associated with said data capturer, and configured to receive at least one of said captured data packets from said data capturer and to record said received data packet;
   at least one remote recorder, remotely communicating with said branch recorder, configured to receive said captured data packets from said branch recorder;
   an interaction controller, associated with said recorder, configured to control interaction of said recorder with at least one remote party, wherein said branch recorder is further configured to forward at least one of said recorded data packets to said remote party, upon recovering from a network disconnection;
   wherein the interaction controller, associated with said data capturer, is configured to capture metadata and control interaction of said data capturer with at least one device, according to said captured metadata; and
   wherein said metadata comprises Computer Telephony Interaction (CTI) data, and said interaction controller is further configured to capture said Computer Telephony Interaction (CTI) data from at least one CTI Server and control interaction of said data capturer with at least one device, according to said captured CTI data.

34. The apparatus of claim 33, wherein said captured data packets are media data packets.

35. The system of claim 33, wherein said data capturer is further configured to capture media data files from at least one device, said branch recorder is further configured to receive said media data files and carry out local branch recording of media data originating from said media data files, and said remote recorder is further configured to receive said recorded media data from said branch recorder.

36. The system of claim 33, comprising a central remote recorder, remotely communicating with said branch recorders, configured to receive at least one of said captured data packets from said branch recorders.

37. The system of claim 33, comprising at least two remote parties, each of said remote parties remotely communicating with at least one of said branch recorders, and configured to receive at least one of said captured data packets from said communicated recorders.

38. Apparatus for recording multi-party Internet Protocol (IP) sessions at a telecommunications branch having an existing branch device associated therewith, the apparatus comprising:
   a data capturer, configured to capture at: least one data packet of a multi-party IP session involving the branch;
   a recorder, associated with said data capturer, and configured to receive at least one of said captured data packets from said data capturer and to carry out local branch recording of said received data packets, the apparatus being deployed on said existing branch device; and
   an interaction controller, associated with said recorder, configured to control interaction of said data capturer with at least one remote CTI server, for capturing said Computer Telephone Integration (CTI) data, and upon unintentional disconnection from said remote CTI server, to control interaction of said data capturer with a local CTI server, for capturing said Computer Telephone Integration (CTI) data relating to said multi-party IP session from a local CTI server.

* * * * *